(12) United States Patent
Shemesh

(10) Patent No.: US 10,988,286 B2
(45) Date of Patent: Apr. 27, 2021

(54) REUSABLE TAMPER-EVIDENT COVER FOR BEVERAGE CANS

(71) Applicant: Chaim Shemesh, Petach Tiqva (IL)

(72) Inventor: Chaim Shemesh, Petach Tiqva (IL)

(*) Notice: Subject to any disclaimer, the term of this patent is extended or adjusted under 35 U.S.C. 154(b) by 0 days.

(21) Appl. No.: 14/544,547

(22) Filed: Jan. 21, 2015

(65) Prior Publication Data

US 2015/0136774 A1 May 21, 2015

Related U.S. Application Data

(63) Continuation-in-part of application No. 13/374,986, filed on Jan. 27, 2012, now abandoned, which is a continuation-in-part of application No. 12/583,950, filed on Aug. 31, 2009, now abandoned.

(51) Int. Cl.
| | |
|---|---|
| *B65D 41/48* | (2006.01) |
| *B65D 17/50* | (2006.01) |
| *B65D 51/18* | (2006.01) |
| *B65D 41/62* | (2006.01) |
| *B65D 41/12* | (2006.01) |
| *B65D 17/28* | (2006.01) |

(52) U.S. Cl.
CPC ......... *B65D 41/48* (2013.01); *B65D 17/4012* (2018.01); *B65D 41/12* (2013.01); *B65D 41/62* (2013.01); *B65D 51/18* (2013.01); *B65D 2251/0015* (2013.01); *B65D 2251/0071* (2013.01); *B65D 2251/0078* (2013.01); *B65D 2517/0098* (2013.01); *Y02W 30/80* (2015.05)

(58) Field of Classification Search
CPC .. B65D 41/185; B65D 41/485; B65D 51/243; B65D 2101/0023; B65D 41/48; B65D 41/46; B65D 41/62; B65D 17/4014; B65D 17/4012; B65D 17/401; B65D 51/24; B65D 51/18; A47G 23/0233; A47G 23/0216; A47G 19/2216; A47G 19/2211
USPC ..... 215/250, 251, 253, 255, 387; 220/257.1, 220/257.2, 266, 269, 270, 276, 319, 320, 220/716, 717, 212, 259.1, 256.1, 254.3, 220/254.1
See application file for complete search history.

(56) References Cited

U.S. PATENT DOCUMENTS

| | | | | |
|---|---|---|---|---|
| 3,292,807 | A * | 12/1966 | Golde | 215/305 |
| 3,438,533 | A * | 4/1969 | Neidl | B65D 55/06 |
| | | | | 220/257.2 |
| 3,684,124 | A * | 8/1972 | Song | 220/270 |
| 3,899,097 | A * | 8/1975 | Aichinger | 215/253 |
| D252,984 | S * | 9/1979 | Moeller | D9/443 |
| 4,423,822 | A * | 1/1984 | Powalowski | 215/365 |

(Continued)

*Primary Examiner* — Robert J Hicks
(74) *Attorney, Agent, or Firm* — Reuven Mouallem; FlashPoint IP Ltd.

(57) ABSTRACT

A reusable single-piece tamper-evident cover for protecting a drinking area of a beverage can before and after removal of the cover from the can. The cover includes: a cover top, a clasp ring positioned below and contiguous with the cover top, and a skirt being positioned below and contiguous with the ring. The ring includes at least one tamper-evident seal that includes two tear lines. The tear lines do not extend to the inner cover surface. Tearing along the tear lines results in tampering the seal, and does not tear the inner cover surface. An entirety of the inner cover surface is able to be continuous when the skirt extends along an entirety of the ring, as well as after removal of the cover from the can.

13 Claims, 21 Drawing Sheets

(56) References Cited

U.S. PATENT DOCUMENTS

| | | | |
|---|---|---|---|
| 4,815,628 A * | 3/1989 | Wehnert, III | B65D 43/0222 |
| | | | 220/258.2 |
| 4,860,907 A * | 8/1989 | Sondal | 215/230 |
| 5,085,333 A * | 2/1992 | Dutt et al. | 215/250 |
| 5,119,955 A * | 6/1992 | Granofsky | B65D 17/506 |
| | | | 220/254.2 |
| 5,875,908 A * | 3/1999 | Witt et al. | 215/256 |
| 7,931,167 B2 * | 4/2011 | Chmela | 220/270 |
| 2007/0062949 A1* | 3/2007 | Bordner | 220/268 |
| 2011/0049172 A1* | 3/2011 | Shemesh | 220/729 |

* cited by examiner

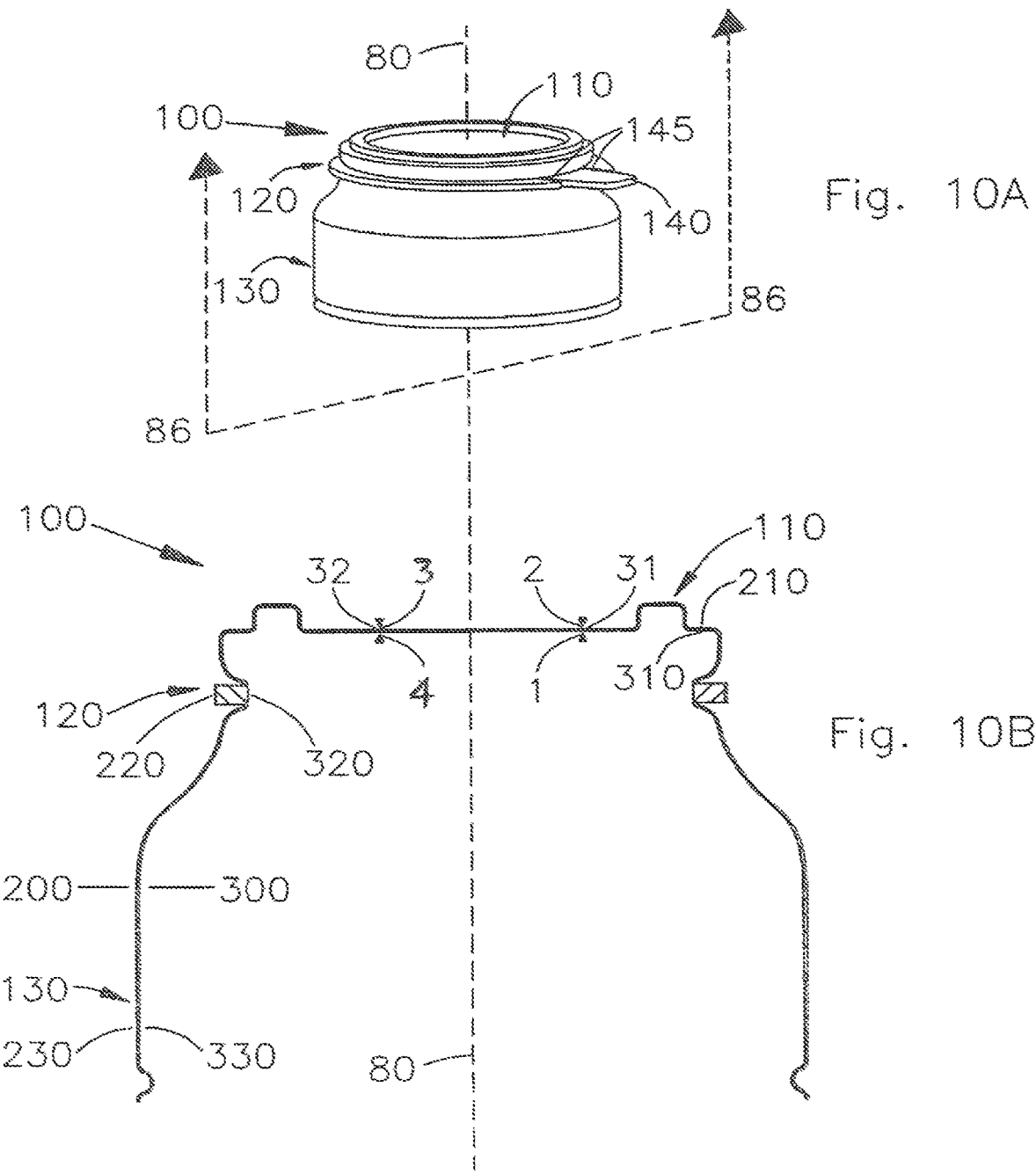

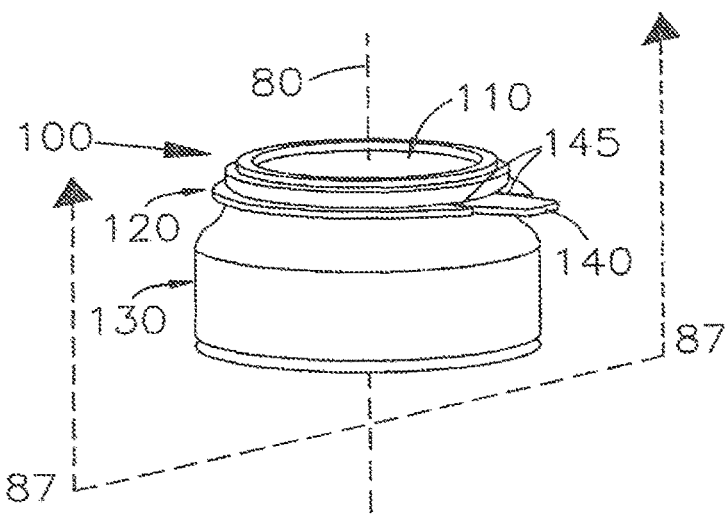
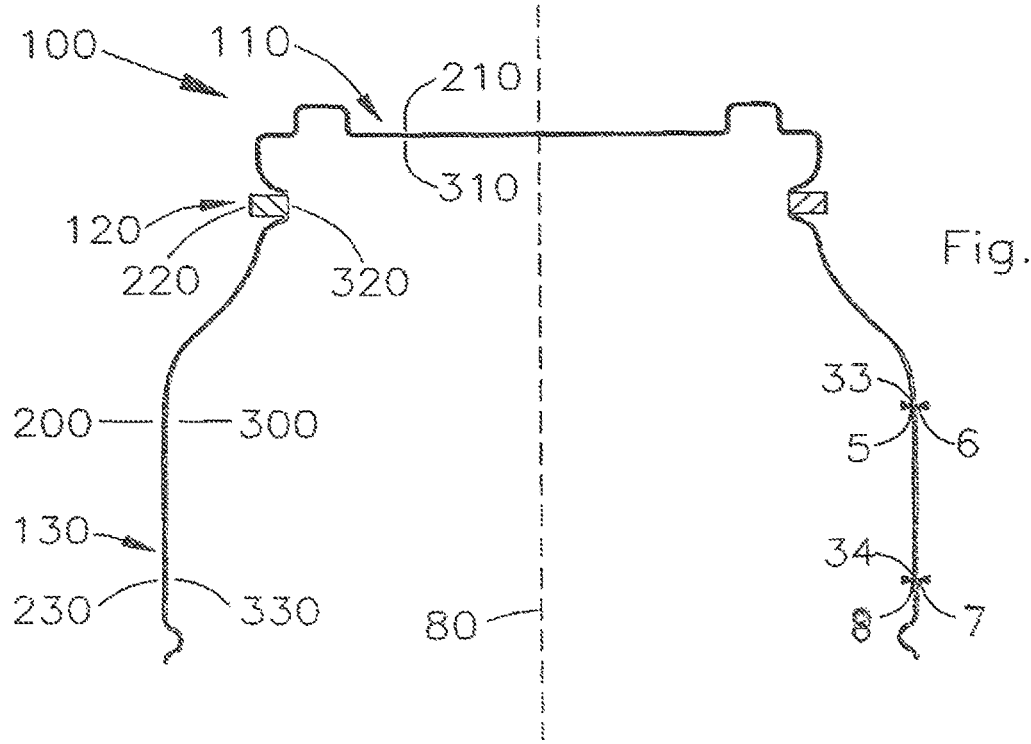

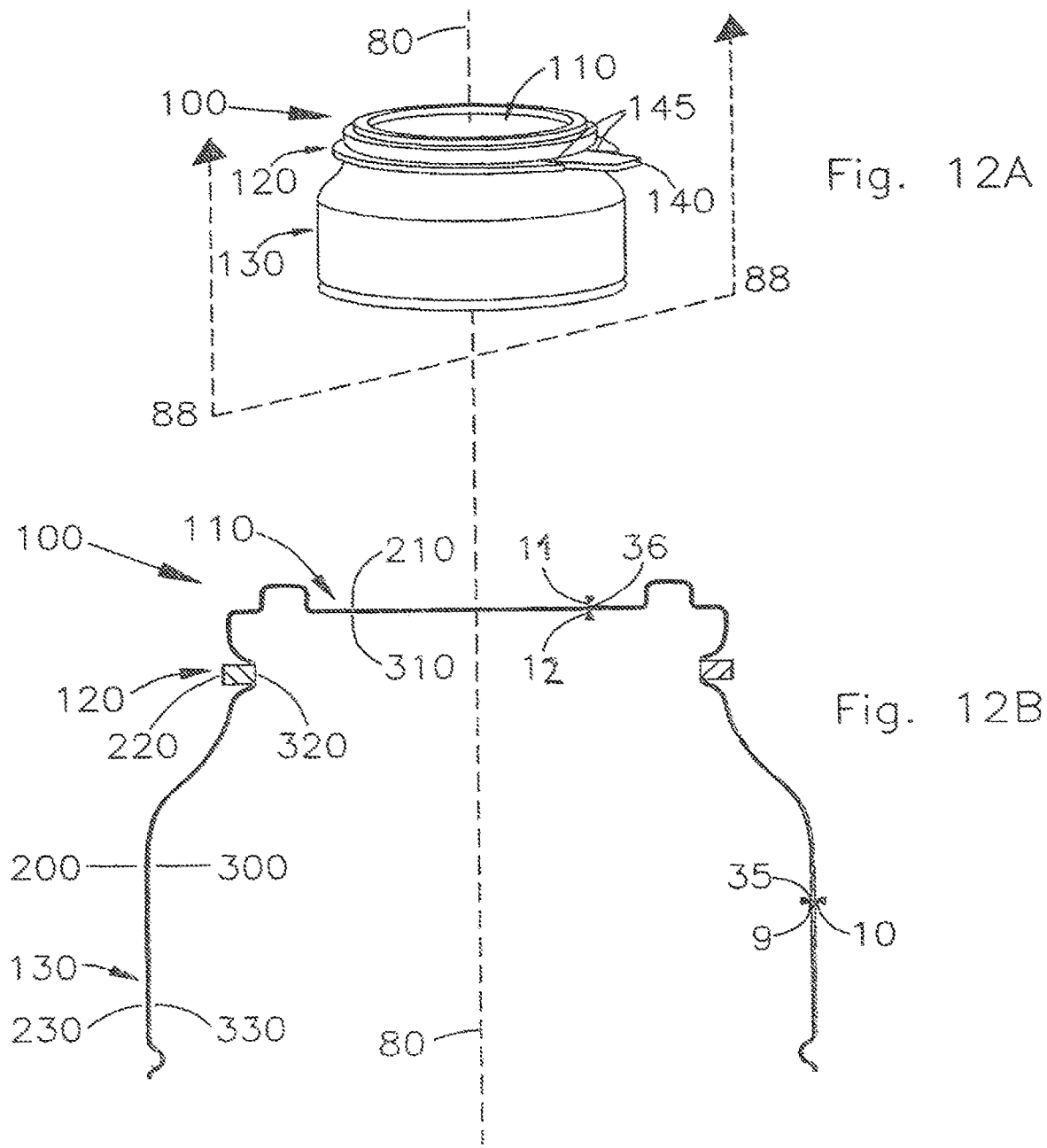

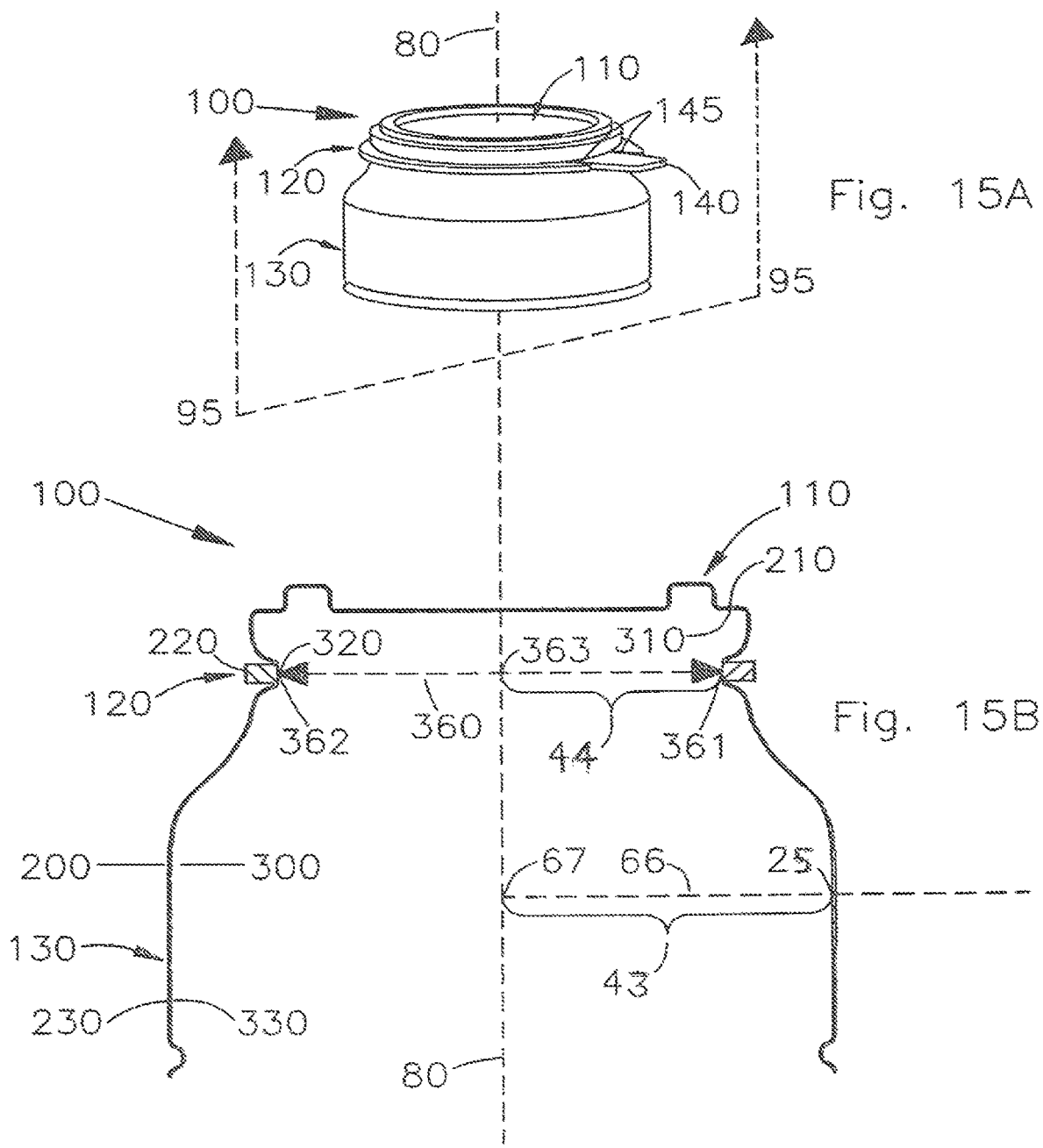

REUSABLE TAMPER-EVIDENT COVER FOR BEVERAGE CANS

CROSS-REFERENCE TO RELATED APPLICATIONS

This application is a continuation-in-part (CIP) application claiming benefit from U.S. patent application Ser. No. 13/374,986, filed Jan. 27, 2012, further claiming benefit from U.S. patent application Ser. No. 12/583,950, filed Aug. 31, 2009, which are hereby incorporated by reference in their entirety.

BACKGROUND

Tamper-evidence describes a device or process that makes unauthorized access to the protected object easily detected. Tamper-evident design is very widespread in the area of product packaging, where it is vital to know that the product has not been altered since it left the manufacturer. The utility of such seals arises from the fact that once the seals are opened, a consumer will know that a cover has been tampered with or opened. Such seals that regard to a tamper-evident cover for beverage cans are typically made of some form of plastic that is affixed to a beverage can or bottle in such a manner that generally precludes removing the tamper-evident cover from the beverage can without also tearing the plastic.

Examples that regard to a tamper-evident cover for beverage cans or bottles that lack at least one of the following elements: the beverage can includes a drinking aperture, the beverage can further includes an inner can surface and an outer can surface, the outer can surface having a circular seam with a first outer can diameter and a circular indentation with a second outer can diameter, the circular indentation being disposed below and in proximity to the circular seam, wherein the first outer can diameter being larger than the second outer can diameter, the cover includes an outer cover surface and an inner cover surface, wherein the cover is configured to be disposed on the beverage can, wherein the beverage can's contents does not come in contact with the inner cover surface when the drinking aperture of the beverage can is closed and when the cover is disposed on the beverage can. The cover includes a cover top including an inner cover-top surface and an outer cover-top surface; a clasp ring including a circular inner clasp-ring surface and an outer clasp-ring surface, wherein the clasp ring is positioned below the cover top, wherein the circular inner clasp-ring surface is contiguous with the inner cover-top surface, wherein the circular inner clasp-ring surface is positioned around the circular indentation when the cover is disposed on the can, wherein the circular inner clasp-ring surface has an inner clasp-ring diameter, wherein the inner clasp-ring diameter has a center point, wherein the circular inner clasp-ring surface includes a longitudinal center axis, wherein the center axis intersects the center point and is perpendicular to the inner clasp-ring diameter; and a skirt including an inner skirt surface and an outer skirt surface, wherein the skirt is positioned below the clasp ring, wherein the inner skirt surface is contiguous with the circular inner clasp-ring surface. The clasp ring includes at least one tamper-evident seal, wherein at least one of the at least one tamper-evident seal is configured to be breachable, wherein all the tamper-evident parts are in the cover itself, wherein the at least one tamper-evident seal including two tear lines, wherein tearing the tear lines results in the at least one tamper-evident seal being breached, wherein tearing the two tear lines and removing the cover from the can do not cause any part of the at least one tamper-evident seal to separate from the cover, wherein the cover may be a single piece cover. The skirt may extend 360 degrees around the center axis and along the clasp ring and, further, when the skirt extends 360 degrees around the center axis and along the clasp ring an entirety of the inner cover surface is able to be continuous, without any discontinuously in the inner cover surface. The at least one tamper-evident seal and the two tear lines extend from a region of the outer cover-top surface and a region of the outer skirt surface substantially adjacent to the clasp ring. The at least one tamper-evident element extends from the clasp ring outwardly away from the center axis and, further, the at least one tamper-evident element extends from the clasp ring in parallel to a virtual, continuous, two-dimensional plane that is at least substantially perpendicular to the center axis. The two tear lines extend partially through the at least one tamper-evident seal such that neither of the two tear lines extends to the inner cover surface. A wall thickness of the cover top is able to be uniform, furthermore, a wall thickness of the skirt is able to be uniform, and, furthermore, a wall thickness of the cover top and the skirt is able to be uniform.

The at least one tamper-evident element may extend between a first, virtual, continuous, two-dimensional plane and a second, virtual, continuous, two-dimensional plane, wherein the first, virtual, continuous, two-dimensional plane is at least substantially perpendicular to the center axis, wherein the second, virtual, continuous, two-dimensional plane is parallel to the first, virtual, continuous, two-dimensional plane, and wherein the second, virtual, continuous, two-dimensional plane is position below and in proximity to the first, virtual, continuous, two-dimensional plane, are: U.S. Pat. Nos. 985,000 A; 2,064,167 A; 2,081,138 A; 2,179,879 A; 2,531,570 A; 2,806,620 A; 3,057,503 A; 3,204, 805 A; 3,438,533 A; 3,465,906 A; 3,473,685 A; 3,612,323 A; 4,024,976 A; EP 595498 A1; U.S. Pat. Nos. 4,103,798 A; 4,153,174 A; U.S. D252,984 S; U.S. Pat. Nos. 4,354,610 A; 4,664,288 A; 4,815,628 A; 4,927,048 A; 4,942,974 A; 5,038, 951 A; 5,048,706 A; 5,052,574 A; 5,119,955 A; 5,139,163 A; 5,207,783 A; 5,273,176 A; 5,307,948 A; U.S. D383, 978 S; U.S. Pat. No. 5,996,833 A; US-2003/0201266 A1; U.S. Pat. Nos. 7,694,837 B2; 3,899,097; and 3,292,807.

Examples that regard to a tamper-evident cover for beverage cans that include at least one of the above elements, but where a tear occurs in their inner surface after the at least one tamper-evident seal being breached, are: U.S. Pat. Nos. 985,000 A; 2,064,167 A; 2,081,138 A; 2,179,879 A; 2,531, 570 A; 2,806,620 A; 3,057,503 A. 3,204,805 A; 3,438,533 A; 3,465,906 A; 3,473,685 A; 3,612,323 A; 4,024,976 A; EP 595498 A1; U.S. Pat. Nos. 4,153,174 A; 4,354,610 A; 4,664,288 A; 4,927,048 A; 4,942,974 A; 5,038,951 A; 5,048, 706 A; 5,052,574 A; 5,119,955 A; 5,139,163 A; 5,207,783 A; 5,273,176 A; 5,307,948 A; U.S. D383, 978 S; U.S. Pat. No. 5,996,833 A; US-2003/0201266 A1; U.S. Pat. Nos. 7,694, 837 B2; and 3,292,807.

SUMMARY

It is noted that in the Summary and Detailed Description elements such as points, distances, and planes are indexed in an increasing numerical order in order to more clearly distinguish various features among the embodiments described herein. In the Claims, such elements are numerically specified according to their dependencies. For example, the term "any fifth point" mentioned below in the Summary and Detailed Description below corresponds to the term "any first point" in Claim 5 which is dependent on Claim 1.

In accordance with embodiments of the present invention, a reusable tamper-evident cover for a beverage can, wherein the beverage can includes a drinking aperture, the beverage can further includes an inner can surface and an outer can surface, the outer can surface having a circular seam with a first outer can diameter and a circular indentation with a second outer can diameter, the circular indentation being disposed below and in proximity to the circular seam, the first outer can diameter being larger than the second outer can diameter, the outer can surface including a drinking area that is on the outer can surface substantially surrounds the drinking aperture, the cover includes an outer cover surface and an inner cover surface, the cover is removable and is configured to be disposed and redisposed on the beverage can, the cover including: (a) a cover top including an inner cover-top surface and an outer cover-top surface, wherein the inner cover-top surface further includes a circular internal surface, wherein the circular internal surface has an internal diameter, wherein the internal diameter is at least as large as the first outer can diameter, wherein the circular internal surface is positioned around the circular seam when the cover is disposed on the beverage can; (b) a clasp ring disposed below the cover top, the clasp ring includes a circular inner clasp-ring surface and an outer clasp-ring surface, wherein the circular inner clasp-ring surface is positioned below the inner cover-top surface, wherein the circular inner clasp-ring surface is contiguous with the inner cover-top surface, wherein the circular inner clasp-ring surface is disposed in proximity to the circular internal surface, wherein the circular inner clasp-ring surface has an inner clasp-ring diameter, wherein the inner clasp-ring diameter has a first clasp-ring endpoint and a second clasp-ring endpoint, wherein the inner clasp-ring diameter has a center point, wherein the inner clasp-ring diameter is smaller than the internal diameter, wherein the inner clasp-ring diameter is at least as large as the second outer can diameter, wherein the inner clasp-ring diameter is smaller than the first outer can diameter, wherein the circular inner clasp-ring surface is positioned around the circular indentation when the cover is disposed on the beverage can, wherein the circular inner clasp-ring surface includes a longitudinal center axis, wherein the center axis intersects the center point, wherein the center axis is perpendicular to the inner clasp-ring diameter, the clasp ring further includes at least one tamper-evident seal, wherein at least one of the at least one tamper-evident seal is configured to be breachable, the clasp ring is further configured to prevent removal of the cover from the beverage can while the at least one tamper-evident seal is intact when the cover is disposed on the beverage can, wherein the clasp ring is further configured to enable removal of the cover from the beverage can upon at least one previously unbreached seal of the at least one tamper-evident seal being breached when the cover is disposed on the beverage can, the at least one tamper-evident seal including: (i) a movable seal tab including a first side and a second side opposing each other; (ii) two tear lines including a first tear line and a second tear line; and (iii) two seal stubs including a first seal stub and a second seal stub; wherein the tab is disposed between the two seal stubs, wherein the first side is attached to the first seal stub by the first tear line, and wherein the second side is attached to the second seal stub by the second tear line, and wherein the tab is configured to be moved along the two tear lines, wherein upon moving the tab along the two tear lines causes the two tear lines to tear without separating the tab from the cover, wherein the moving results in the at least one tamper-evident seal being breached; and (c) a skirt disposed below the clasp ring, the skirt includes an inner skirt surface and an outer skirt surface, wherein the inner skirt surface is positioned below the circular inner clasp-ring surface, wherein the inner skirt surface is contiguous with the circular inner clasp-ring surface, wherein the skirt is attached with the at least one tamper-evident seal such that: (i) a virtual, continuous, two-dimensional triangle has a first corner and a second corner, wherein the first corner and the second corner lie on the center axis, wherein the virtual, continuous, two-dimensional triangle intersects both the skirt and the tab at an intersection, wherein the intersection is continuous along an entirety of the intersection; and (ii) the at least one tamper-evident seal is externally disposed from the outer cover-top surface and the outer skirt surface such that the tab, the two tear lines, and the two seal stubs extend: (A) from the clasp ring outwardly away from the center axis; (B) from a region of the outer cover-top surface and a region of the outer skirt surface substantially adjacent to the clasp ring; (C) in parallel to a virtual, continuous, two-dimensional plane that is at least substantially perpendicular to the center axis, wherein the virtual, continuous, two-dimensional plane has an in-plane axis intersecting the center axis; and (D) at least substantially in parallel to the in-plane axis, wherein the virtual, continuous, two-dimensional plane intersects the two tear lines, and wherein the in-plane axis is equidistant from the first tear line and from the second tear line; and (iii) wherein the two tear lines extend partially through the at least one tamper-evident seal such that neither of the two tear lines extends to the inner cover surface, wherein the clasp ring is further externally disposed from the outer cover-top surface and the outer skirt surface, wherein the inner cover-top surface, the circular inner clasp-ring surface, and the inner skirt surface are included in the inner cover surface, and wherein the outer cover-top surface, the outer clasp-ring surface, and the outer skirt surface are included in the outer cover surface; and whereby upon moving the tab along the two tear lines causes the two tear lines to tear externally of the outer cover-top surface and the outer skirt surface without tearing the inner cover surface.

In accordance with the embodiments, the cover is configured to be disposed on the beverage can, wherein the beverage can's contents does not come in contact with the inner cover surface when the drinking aperture of the beverage can is closed and when the cover is disposed on the beverage can.

In accordance with the embodiments, the cover may also be configured to be redisposed on the beverage can.

In accordance with the embodiments, the cover may also be configured such that breaching one of the tamper-evident seals indicates that the cover may have been previously removed from the beverage can and redisposed on the beverage can.

In accordance with the embodiments, the cover may also be configured such that all tamper-evident parts are only in the cover itself.

In accordance with the embodiments, the cover may also be configured such that the inner cover surface is able to protect the hygienic status of an entirety of the drinking area of the beverage can as long as the cover is disposed on the beverage can, the cover covers the entirety of the drinking area, and all the tamper-evident seals of the cover are intact.

In accordance with the embodiments, the beverage can includes a can top and a can body. The can top includes the drinking aperture. The can top further includes a push-top tab which may open the drinking aperture. The circular seam may protrude outwardly immediately above the circular indentation. The can top may be bounded with the can body by the circular seam. The outer can surface may further include an outer cylindrical surface. The outer can surface may further include a sloped surface that may extend between the circular indentation and the outer cylindrical surface. The drinking area of the beverage can may be also an area on the outer can surface contacted by a drinker's lips when drinking from the beverage can.

In accordance with the embodiments, the cover is also configured such that when the cover is applied on the beverage can the cover top covers the can top and may conform substantially to an upper surface of the outer can surface. The skirt of the cover may conform substantially to part of an outer surface of the body can of the beverage can, in which the sloped surface and part of the outer cylindrical surface of the beverage can are located. The clasp ring surrounds and may wrap tightly around the circular indentation. Since the lower part of the skirt extends downwardly from the clasp ring, and since the clasp ring is located immediately below the circular seam surrounding the circular indentation, the cover may cover the entirety of the drinking area of the beverage can when the cover is disposed on the beverage can.

In accordance with the embodiments, the cover is also configured such that an entirety of the inner cover surface is able to be continuous when the skirt extends 360 degrees around the center axis and along the clasp ring. Furthermore, when the skirt extends 360 degrees around the center axis and along the clasp ring the entirety of the inner cover surface is able to be continuous also after removal of the cover from the beverage can. Therefore, when the skirt extends 360 degrees around the center axis and along the clasp and after the cover is redisposed on the beverage can, the cover may able to protect the entirety of the drinking area of the beverage can in any position in which the cover may be positioned in relation to the drinking aperture of the beverage can. As a result, after tampering the at least one tamper-evident seal and when the cover is redisposed on the beverage can, the user does not need to coordinate the position of the skirt of the cover in relation to the drinking aperture of the beverage can to achieve a covering and a protection of the drinking area of the beverage can.

In accordance with the embodiments, the cover may be configured such that the skirt extends 360 degrees around the center axis and along the clasp ring, and wherein the inner skirt surface is contiguous, 360 degrees around the center axis, with the circular inner clasp-ring surface such that a given, virtual, continuous, two-dimensional triangle has a first given corner and a second given corner, wherein the first given corner and the second given corner lie on the center axis, wherein the given, virtual, continuous, two-dimensional triangle intersects both the skirt and the clasp ring at a resulting intersection, wherein the resulting intersection is continuous along an entirety of the resulting intersection.

In accordance with the embodiments, the cover may be configured such that: the skirt extends 360 degrees around the center axis and along the clasp ring, and wherein the inner cover surface is continuous such that a virtual, continuous, two-dimensional rectangle has two opposing corners including a first opposing corner and a second opposing corner, wherein the first opposing corner and the second opposing corner lie on the center axis, wherein the virtual, continuous, two-dimensional rectangle intersects the inner cover surface at an inner intersection, wherein the inner intersection is continuous along an entirety of the inner intersection.

In accordance with the embodiments, the cover may also be configured such that the skirt may extend 360 degrees around the center axis and along the clasp ring, wherein the inner skirt surface is contiguous, 360 degrees around the center axis, with the circular inner clasp-ring surface. Further, the skirt may extend 360 degrees around the center axis and along the clasp ring, wherein the entirety of the inner cover surface is continuous, without any discontinuation in the inner cover surface.

In accordance with the embodiments, the cover may be configured such that: a first distance from any first point lying on the inner cover-top surface to any second point lying on the outer cover-top surface is at least substantially equal to a second distance from any third point lying on the outer cover-top surface to any fourth point lying on the inner cover-top surface, wherein the any second point is nearest to the any first point, and wherein the any fourth point is nearest to the any third point.

In accordance with the embodiments, the cover may be configured such that: a third distance from any fifth point lying on the inner skirt surface to any sixth point lying on the outer skirt surface is at least substantially equal to a fourth distance from any seventh point lying on the outer skirt surface to any eighth point lying on the inner skirt surface, wherein the any sixth point is nearest to the any fifth point, and wherein the any eighth point is nearest to the any seventh point.

In accordance with the embodiments, the cover may be configured such that: a fifth distance from any ninth point lying on the inner cover-top surface and the inner skirt surface to any tenth point lying on the outer cover-top surface and the outer skirt surface is at least substantially equal to a sixth distance from any eleventh point lying on the outer cover-top surface and the outer skirt surface to any twelfth point lying on the inner cover-top surface and the inner skirt surface, wherein the any tenth point is nearest to the any ninth point, and wherein the any twelfth point is nearest to the any eleventh point.

In accordance with the embodiments, the cover may also be configured so that in the cover top and the skirt may be used a minimal amount of material per unit of covered area of the beverage can. An extra amount of material may be used for the at least one tamper-evident seal and the clasp ring. The clasp ring, for example, when the clasp ring extends, 360 degrees around the center axis, from the outer cover-top surface and the outer skirt surface, may be also for an enablement of removal of the cover from the beverage can only after tampering the at least one tamper-evident seal. Consequently, the process of tampering the at least one tamper-evident seal, and the enablement of removal of the cover from the beverage can only after tampering the at least one tamper-evident seal, is dependent primarily on a structure of the at least one tamper-evident seal and the clasp ring, and is minimally dependent on a structure of the cover top and the skirt. Thus, a wall thickness of the cover top may be minimal and may be substantially uniform. A wall thickness of the skirt may be minimal and may be substantially uniform. A wall thickness of the cover top and the skirt may be minimal and may be substantially uniform. Furthermore, a wall thickness of the at least one tamper-evident seal may be greater than the wall thickness of the cover top. The wall thickness of the at least one tamper-evident seal may be greater than the wall thickness of the skirt. The wall thickness of the at least one tamper-evident seal may be greater than the wall thickness of the cover top and the skirt. Furthermore, when the clasp ring is further externally disposed, 360 degrees around the center axis, from the outer cover-top surface and the outer skirt surface, a wall thickness of the clasp ring may be greater than the wall thickness of the cover top. The wall thickness of the clasp ring may be greater than the wall thickness of the skirt. The wall thickness of the clasp ring may be greater than the wall thickness of the cover top and the skirt.

In accordance with the embodiments, the cover may be configured such that: each of the two tear lines is externally disposed from the outer cover-top surface and the outer skirt surface such that any thirteenth point lying on the circular inner clasp-ring surface, and lying on a virtual, geometric ray, wherein the virtual, geometric ray satisfies the criteria of: (E) the virtual, geometric ray being straight one-dimensional object having one, ray endpoint; (F) the virtual, geometric ray being perpendicular to the center axis; (G) the one ray endpoint lying on the center axis; and (H) the virtual, geometric ray intersecting one of the two tear lines, wherein a seventh distance from the any thirteenth point to any fourteenth point lying on the outer clasp-ring surface, and lying on the virtual, geometric ray is greater than an eighth distance and a ninth distance, wherein the eighth distance is from any fifteenth point lying on the inner cover-top surface and the inner skirt surface to any sixteenth point lying on the outer cover-top surface and the outer skirt surface, wherein the ninth distance is from any seventeen point lying on the outer cover-top surface and the outer skirt surface to any eighteen point lying on the inner cover-top surface and the inner skirt surface, wherein the any sixteenth point is nearest to the any fifteenth point, and wherein the eighteen point is nearest to the seventeen point.

In accordance with the embodiments, the cover may be configured such that: the clasp ring is further externally disposed, 360 degrees around the center axis, from the outer cover-top surface and the outer skirt surface such that any nineteenth point lying on the circular inner clasp-ring surface, and lying on a given, virtual, geometric ray, wherein the given virtual, geometric ray satisfies the criteria of: (iv) the given, virtual, geometric ray being a straight one-dimensional object having a given, one, ray endpoint; (v) the given, virtual, geometric ray being perpendicular to the center axis; (vi) the given, one, ray endpoint lying on the center axis; and (vii) the given, virtual, geometric ray intersecting the clasp ring, wherein a tenth distance from the any nineteenth point to any twenty point lying on the outer clasp-ring surface, and lying on the given, virtual, geometric ray, is greater than an eleventh distance and a twelfth distance, wherein the eleventh distance is from any twenty-first point lying on the inner cover-top surface and the inner skirt surface to any twenty-second point lying on the outer cover-top surface and the outer skirt surface, wherein the twelfth distance is from any twenty-third point lying on the outer cover-top surface and the outer skirt surface to any twenty-fourth point lying on the inner cover-top surface and the inner skirt surface, wherein the any twenty-second point is nearest to the any twenty-first point, and wherein the any twenty-fourth point is nearest to the any twenty-third point.

In accordance with the embodiments, the cover may be configured such that the at least one tamper-evident seal extends from the clasp ring outwardly away from the center axis. The at least one tamper-evident seal protrudes outwardly relative to adjacent regions on the outer cover surface such that the tab, the two tear lines, and the two stub seals extend from a region of the outer cover-top surface and a region of the outer skirt surface substantially adjacent to the clasp ring. The tear lines begin to extend from places that lie on the outer cover-top surface and the outer skirt surface, wherein the places are substantially adjacent to the clasp ring. The first tear line has a first end and a second end, wherein the first end of the first tear line is closer to the center axis than the second end of the first tear line. The second tear line has a first end and a second end, wherein the first end of the second tear line is closer to the center axis than the second end of the second tear line. The first end of the first tear line and the first end of the second tear line lie on the outer cover-top surface and the outer skirt surface. Furthermore, the at least one tamper-evident seal extends in parallel to the virtual, continuous, two-dimensional plane that is at least substantially perpendicular to the center axis, wherein the virtual, continuous, two-dimensional plane has the in-plane axis intersecting the center axis. Furthermore, the at least one tamper-evident seal extends at least substantially in parallel to the in-plane axis, wherein the virtual, continuous, two-dimensional plane intersects the two tear lines, and wherein the in-plane axis is equidistant from the first tear line and from the second tear line. These structural features, which are explained above, enable the tear lines to be limited to the at least one tamper-evident seal, and furthermore enable the tear lines to extend partially through the at least one tamper-evident seal such that neither of the tear lines extend to the inner cover surface. Therefore, these structural features enable forming of the cover in a way that tearing the tear lines, thus breaching the at least one tamper-evident seal and consequently damaging the integrity of the clasp ring, does not tear the inner cover surface. As a result, the inner cover surface remains intact.

In accordance with the embodiments, the cover may be configured such that when the cover is disposed on the beverage can and the tear lines are intact the clasp ring may prevent the cover from being lifted off from the beverage can without damaging the integrity of the clasp ring. The cover may also be configured such that when the cover is disposed on the beverage can and the tear lines are intact tearing the two tear lines causes the circular inner clasp-ring surface to be able to be moved above the circular seam, thus causing the clasp ring to enable removal of the cover from the beverage can. The clasp ring clasps the cover against the circular indentation. The clasp ring may protrude outwardly relative to adjacent areas on the outer cover surface. The clasp ring may extend from the outer cover-top surface and the outer skirt surface. Furthermore, the clasp ring may extend 360 degrees around the center axis, from the outer cover-top surface and the outer skirt surface. The clasp ring may be stiff enough so that when the cover is disposed on the beverage can and the tear lines are intact, the clasp ring prevents the cover from being lifted off from the beverage can without damaging the integrity of the clasp ring. Furthermore, when the clasp ring extends 360 degrees around the center axis, from the outer cover-top surface and the outer skirt surface, the clasp ring is stiff enough so that when the cover is disposed on the beverage can and the tear lines are intact, the clasp ring prevents the cover from being lifted off from the beverage can without damaging the integrity of the clasp ring. When tearing the tear lines, thus breaching the at least one tamper-evident seal, the integrity of the clasp ring are damaged. As a result, the clasp ring becomes flexible and stretchable. So much so that the clasp ring no longer provides sufficient resistance to pulling the cover and the circular inner clasp-ring surface is easily moved above the circular seam, thereby enabling easy removal of the cover from the beverage can.

In accordance with the embodiments, the cover may be configured such that the circular inner clasp-ring surface bulges inwardly such that any twenty-fifth point lying on the inner skirt surface, and on a virtual, given, geometric ray, wherein the virtual, given, geometric ray satisfies the criteria of: (iv) the virtual, given, geometric ray being a straight one-dimensional object having one, given, ray endpoint; (v) the virtual, given, geometric ray being perpendicular to the center axis; (vi) the one, given, ray endpoint lying on the center axis; and (vii) the virtual, given, geometric ray intersecting the inner skirt surface, wherein an thirteenth distance from the any twenty-fifth point to the one, given, ray endpoint, is greater than a fourteen distance from the center point to one of the first clasp-ring endpoint and the second clasp-ring endpoint.

In accordance with the embodiments, the cover may be configured such that the circular inner clasp-ring surface is defined morphologically due to the following characterizations. The inner clasp-ring diameter of the circular inner clasp-ring surface of the clasp-ring is smaller than the internal diameter of the circular internal surface of the inner cover-top surface of the cover top. Wherein the circular inner clasp-ring surface is positioned below the inner cover-top surface. Wherein the circular inner clasp-ring surface is contiguous with the inner cover-top surface. Wherein the circular inner clasp-ring surface being disposed below and in proximity to the circular internal surface. Further, the eleventh distance from the any twenty-first point to the one given ray endpoint, is greater than the twelfth distance from the center point of the inner clasp-ring diameter to one of the first clasp-ring endpoint and the second clasp-ring endpoint of the inner clasp-ring diameter. Wherein the inner skirt surface is positioned below the circular inner clasp-ring surface. Wherein the inner skirt surface is contiguous with the circular inner clasp-ring surface.

In accordance with the embodiments, the cover may be configured such that the at least one tamper-evident seal is further externally disposed from the outer cover-top surface and the outer skirt surface such that the tab, the two tear lines, and the two seal stubs extend between a first, virtual, continuous, two-dimensional plane and a second, virtual, continuous, two-dimensional plane, wherein the first, virtual, continuous, two-dimensional plane is at least substantially perpendicular to the center axis, wherein the second, virtual, continuous, two-dimensional plane is parallel to the first virtual, continuous, two-dimensional plane, and wherein the second, virtual, continuous, two-dimensional plane is positioned below and in proximity to the first, virtual, continuous, two-dimensional plane.

In accordance with the embodiments, the cover may be configured such that the clasp ring extends between a third, virtual, continuous, two-dimensional plane and a fourth, virtual, continuous, two-dimensional plane, wherein the third, virtual, continuous, two-dimensional plane is at least substantially perpendicular to the center axis, wherein the fourth, virtual, continuous, two-dimensional plane is parallel to the third virtual, continuous, two-dimensional plane, and wherein the fourth, virtual, continuous, two-dimensional plane is positioned below and in proximity to the third, virtual, continuous, two-dimensional plane.

In accordance with the embodiments, the cover may be configured such that the clasp ring is further externally disposed, 360 degrees around the center axis, from the outer cover-top surface and the outer skirt surface, such that the clasp ring extends between a fifth, virtual, continuous, two-dimensional plane and a sixth, virtual, continuous, two-dimensional plane, wherein the fifth, virtual, continuous, two-dimensional plane is at least substantially perpendicular to the center axis, wherein the sixth, virtual, continuous, two-dimensional plane is parallel to the fifth virtual, continuous, two-dimensional plane, and wherein the sixth, virtual, continuous, two-dimensional plane is positioned below and in proximity to the fifth, virtual, continuous, two-dimensional plane.

In accordance with the embodiments, the cover may be configured such that an enablement of the at least one tamper-evident seal to extend between the first, virtual, continuous, two-dimensional plane and the second, virtual, continuous, two-dimensional plane, wherein the second, virtual, continuous, two-dimensional plane is positioned below and in proximity to the first, virtual, continuous, two-dimensional plane, enabling a comfortable grip of the tab. For example, when griping the tab, the thumb may be positioned above the tab and the index finger may be positioned below the tab at the same time, making it easy to grip the tab. It is noteworthy that the tear lines may be configured to facilitate easy separation of the tab from the seal stubs via the application of upward pressure on the tab. It is also noteworthy that the tear lines may also be configured to facilitate easy separation of the tab from the seal stubs via the application of downward pressure on the tab as well. Accordingly, the user can use the tab for removing the cover from the beverage can and can also use the tab for redisposing the cover on the beverage can, in a simple, comfortable, and intuitive manner.

In accordance with the embodiments, the cover may be configured such that such that the enablement of the clasp ring to extends between the third, virtual, continuous, two-dimensional plane and the fourth, virtual, continuous, two-dimensional plane and, further, the enablement of the clasp ring to extend between the fifth, virtual, continuous, two-dimensional plane and the sixth, virtual, continuous, two-dimensional plane, wherein the clasp ring is further externally disposed, 360 degrees around the center axis, from the outer cover-top surface and the outer skirt surface, means that the process of tampering the at least one tamper-evident seal, and the enablement of removal of the cover from the beverage can after tampering the at least one tamper-evident seal, depends mainly on the structure of the at least one tamper-evident seal and the clasp ring, while the process of tampering plays a minor role on the structure of the cover top and the skirt.

In accordance with the embodiments, the cover may be configured such that the enablement of the clasp ring to extend between the third, virtual, continuous, two-dimensional plane and the fourth, virtual, continuous, two-dimensional plane and, further, the enablement of the clasp ring to extend between the fifth, virtual, continuous, two-dimensional plane and the sixth, virtual, continuous, two-dimensional plane, wherein the clasp ring is further externally disposed, 360 degrees around the center axis, from the outer cover-top surface and the outer skirt surface, may enable the wall thickness of the top cover to be uniform and relatively thin. Furthermore, the wall thickness of the skirt may be uniform and relatively thin. Furthermore, the wall thickness of the top cover and the skirt may be uniform and relatively thin, therefore causing the use of a minimal amount of material for the manufacturing of the cover.

In accordance with the embodiments, the cover may be configured such that the cover top, the clasp ring, the at least one tamper-evident seal, and the skirt are initially configured as a single unitary structure.

In accordance with the embodiments, the cover may be configured so that upon moving the tab along the two tear lines causes the two tear lines to tear without separating the tab from the cover. Further, the cover top, the clasp ring, the at least one tamper-evident seal, and the to skirt may initially be configured as a single unitary structure. Further, no part of the cover may separate from the cover in the process of tampering the at least one tamper-evident seal of the cover and removing and redisposing of the cover on the beverage can. So, the only change in the cover after tampering the at least one tamper-evident seal may be the tears in the tear lines, while the tears of the tear lines are limited only to the at least one tamper-evident seal. While the tears of the tear lines do not extend to the inner cover surface and do not cause the inner cover surface to tear.

In accordance with the embodiments, the cover may be made from plastic material in an industrial process known as vacuum forming. Vacuum forming is a simplified version of thermoforming, whereby a sheet of plastic is heated to a forming temperature, stretched onto, or into, a one-surface mold, and held against the mold by applying the vacuum between the mold surface and the sheet. The vacuum-forming process can be used for most product packaging. Relatively deep parts can be formed if the formable sheet is mechanically- or pneumatically-stretched prior to bringing the sheet in contact with the mold surface and before the vacuum is applied. Conventional thermoplastics are suitable materials for use in vacuum forming. The cover can be installed by softening and expanding a clasp-ring area of the cover by applying heat, then placing the clasp ring on the circular seam of the beverage can. Pressure is then applied on the cover during placement, causing the clasp ring to move downward. When the warmed area cools down, the clasp ring shrinks and hardens and is thus fixed in place below the circular seam, so that the circular inner clasp-ring surface of the clasp ring is positioned around the circular indentation of the beverage can.

Accordingly, several advantages of one or more aspects of the cover are as follows:

The cover is a reusable and can be removed from and replaced on the beverage can repeatedly, easily, and in an intuitive manner. The cover may cover the entire drinking area of the beverage can when the cover is disposed on the beverage can and after redisposing the cover on the can. Therefore, the cover may be reused to restore the protection of the beverage can's drinking area against contamination from the outside environment. Further, the cover may protect and retain the freshness of the beverage can's contents after the drinking aperture of the beverage can is open and after redisposing the cover on the beverage can.

The cover may be a single-piece cover. The morphology of the build of the beverage can is exploited for the minimal necessity of materials for the manufacturing of the cover.

Tears that can occur in tear lines at the time of tampering the at least one tamper-evident seal and removal of the cover from the beverage can do not tear the inner cover surface. The entirety of the inner cover surface is able to be continuous when the skirt extends 360 degrees around the center axis and along the clasp ring. Furthermore, when the skirt extends 360 degrees around the center axis and along the clasp ring the entirety of the inner cover surface is able to be continuous also after removal of the cover from the beverage can. Therefore, after the cover is redisposed on the beverage can, the protection of the beverage can's drinking area may be restored in any position in which the cover may be positioned in relation to the drinking aperture of the beverage can. As a result, the user does not need to coordinate the position of the cover in relation to the drinking aperture of the beverage can. This is a feature of the cover that is especially useful for people constantly on the move.

For the above mentioned reasons, the cover is applied specifically to beverage cans, the construction of which does not permit covers known in the art that consist of more than a single piece to offer the same benefits as our single-piece cover.

Finally, the cover is simple, easy to use, uses minimal amount of material, is cheaper to manufacture, is easier to apply than covers known in the art, and can be fitted easily to a variety of beverage cans. Therefore, the cover has a wider and more flexible scope of use than other covers for beverage cans known in the art.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 10A and 10B are schematic illustrations of another structural aspect of the cover of FIG. 1;

FIGS. 11A and 11B are schematic illustrations of another structural aspect of the cover of FIG. 1;

FIGS. 12A and 12B are schematic illustrations of another structural aspect of the cover of FIG. 1;

FIGS. 15A and 15B are schematic illustrations of another structural aspect of the cover of FIG. 1;

Figure 1:
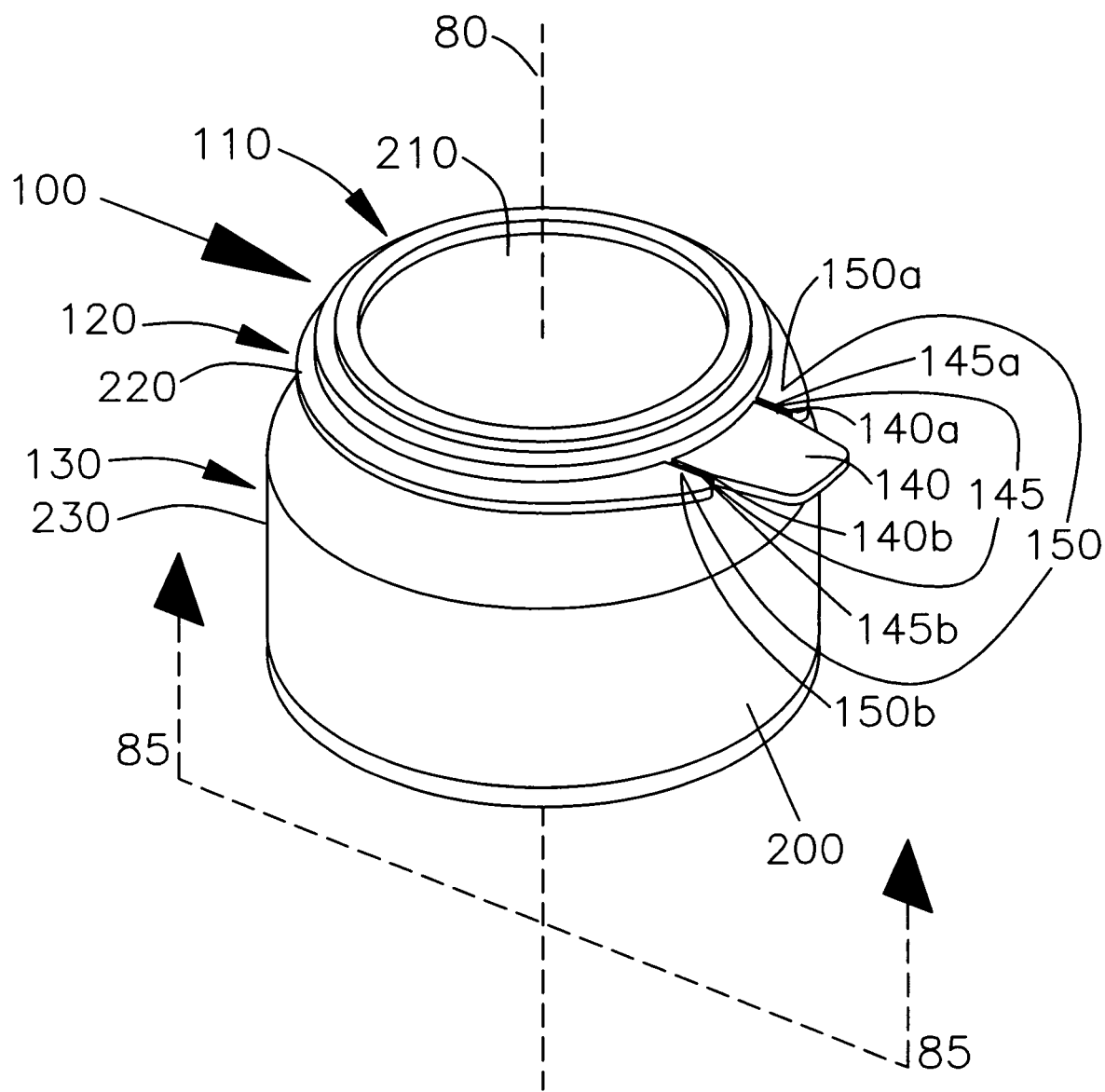
FIG. 1 is a schematic illustration of a novel reusable tamper-evident cover for a beverage can, constructed and operative in accordance with embodiments of the present invention.

It is appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It is noted that at least one tamper-evident seal is incorporated into a cover for a beverage can (in accordance with FIGS. 1-18) or bottle (in accordance with FIG. 19) to provide a tamper-evident cover for a beverage can which may also be reusable.

Reference is now made to FIG. 1, which illustrates a reusable tamper-evident cover 100 for a beverage can, constructed and operative in accordance with embodiments of the present invention.

The cover 100 may be formed of a single piece of semi-elastic piece of material, such as, for example, a thermoplastic. The cover 100 includes an outer cover surface 200 and an inner cover surface 300 (not shown in FIG. 1). The cover 100 includes a cover top 110. The cover top 110 includes an outer cover-top surface 210 and an inner cover-top surface 310 (not shown in FIG. 1). The cover 100 further includes a clasp ring 120. The clasp ring 120 includes an outer clasp-ring surface 220 and a circular inner clasp-ring surface 320 (not shown in FIG. 1). The circular inner clasp-ring surface 320 includes a longitudinal center axis 80. The clasp ring 120 is positioned below the cover top 110. The circular inner clasp-ring surface 320 is positioned below the inner cover-top surface 310. The circular inner clasp-ring surface 320 is contiguous with the inner cover-top surface 310. The cover 100 further includes a skirt 130. The skirt 130 includes an outer skirt surface 230 and an inner skirt surface 330 (not shown in FIG. 1). The skirt 130 is positioned below the clasp ring 120. The inner skirt surface 330 is positioned below the circular inner clasp-ring surface 320. The inner skirt surface 330 is contiguous with the circular inner clasp-ring surface 320. The outer cover-top surface 210, the outer clasp-ring surface 220, and the outer skirt surface 230 are included in the outer cover surface 200. The inner cover-top surface 310, the circular inner clasp-ring surface 320, and the inner skirt surface 330 are included in the inner cover surface 300. The clasp ring 120 includes the at least one tamper-evident seal. The at least one tamper-evident seal protrudes outwardly from an region of the outer cover-top surface 210 and an region of the outer skirt surface 230 substantially adjacent to the clasp ring 120. The at least one tamper-evident seal includes seal stubs 150 and a movable seal tab 140 and two tear lines 145. The seal stubs 150 separate from the movable seal tab 140 by the tear lines 145. It is appreciated that the at least one tamper-evident seal is incorporated into the clasp ring 120. It is also appreciated that the seal stubs 150 and the movable seal tab 140 and the tear lines 145 is incorporated into the clasp ring 120. The movable seal tab 140 includes a first side 140a and a second side 140b. The tear lines 145 include a first tear line 145a and a second tear line 145b. The seal stubs 150 include a first seal stub 150a and a second seal stub 150b. The tear lines 145 are configured to facilitate easy separation of the movable seal tab 140 from the seal stubs 150 via the application of upward pressure on the movable seal tab 140. It is appreciated that the tear lines 145 may also be configured to facilitate easy separation of the movable seal tab 140 from the seal stubs 150 via the application of downward pressure on the movable seal tab 140. The movable seal tab 140 is configured such that when the movable seal tab 140 is moved to tear the tear lines 145 the movable seal tab 140 does not separate from the cover 100. The tear lines 145 may be formed by any suitable method known in the art such as, for example, perforation and indentation. It is also appreciated that the tear lines 145 do not extend to the inner cover surface 300. Accordingly, even if the movable seal tab 140 is separated from the seal stubs 150, the inner cover surface 300 remains intact.

Figure 2:
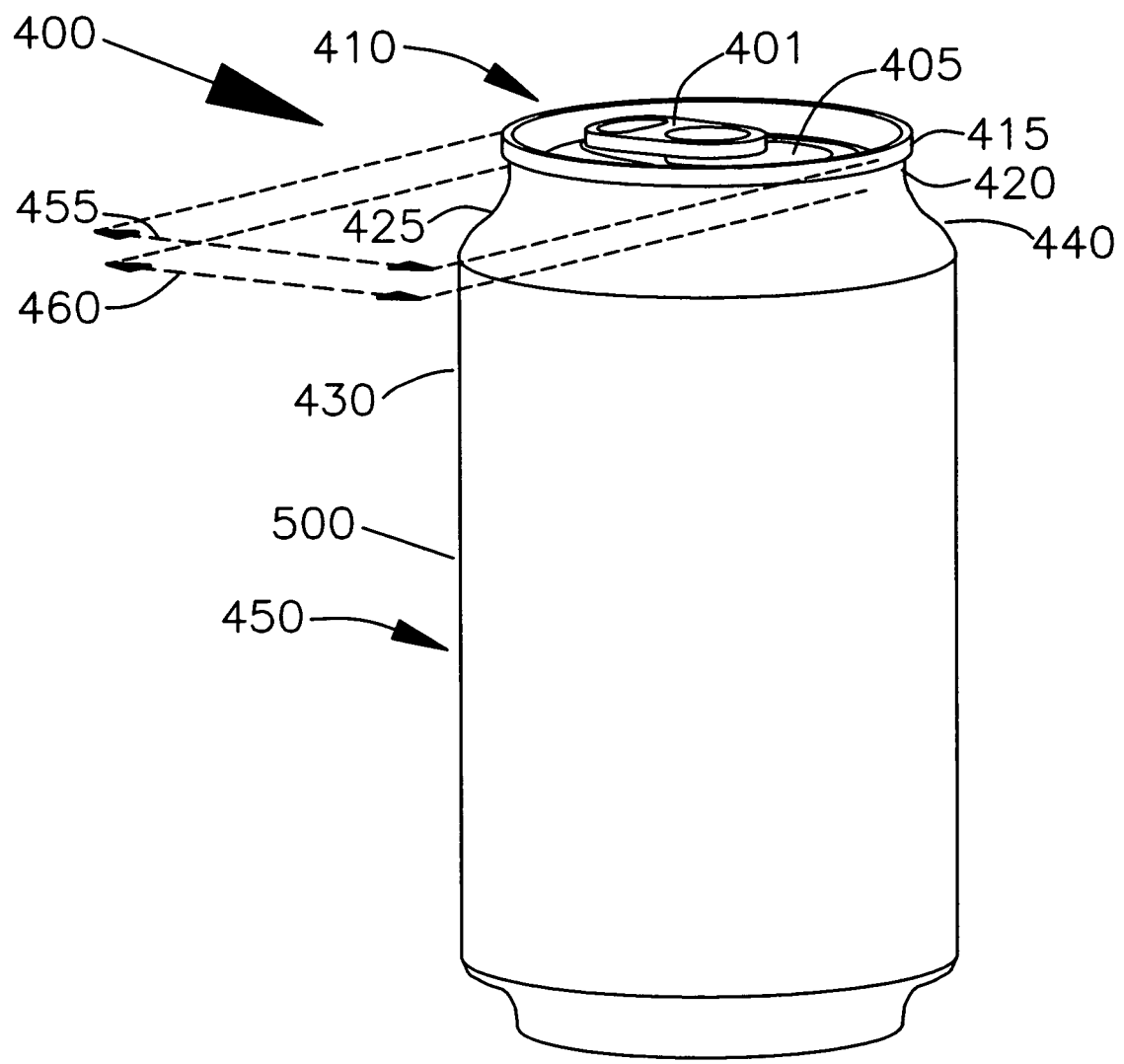
FIG. 2 is a schematic illustration of an exemplary beverage can for use with the cover of FIG. 1.

Reference is now made to FIG. 2 which illustrates a typical beverage can 400 for use with the cover 100 of FIG. 1. The beverage can 400 includes an outer can surface 500 and an inner can surface (not shown). The beverage can 400 includes a can top 410 and a can body 450. The can top 410 includes a drinking aperture 405. The can top 410 further includes a push-top tab 401 which opens the drinking aperture 405. The outer can surface 500 having a circular seam 415 with a first outer can diameter 455 and a circular indentation 420 with a second outer can diameter 460. The circular indentation 420 is disposed below and in proximity to the circular seam 415. The first outer can diameter 455 is larger than the second outer can diameter 460. The circular seam 415 protrudes outwardly immediately above the circular indentation 420. The can top 410 is bounded with the can body 450 by the circular seam 415. The outer can surface 500 further including an outer cylindrical surface 430. The outer can surface 500 further includes a sloped surface 425 that extends between the circular indentation 420 and the outer cylindrical surface 430. The outer can surface 500 includes a drinking area 440 that is on the outer can surface 500 substantially surrounding the drinking aperture 405.

Figure 3:
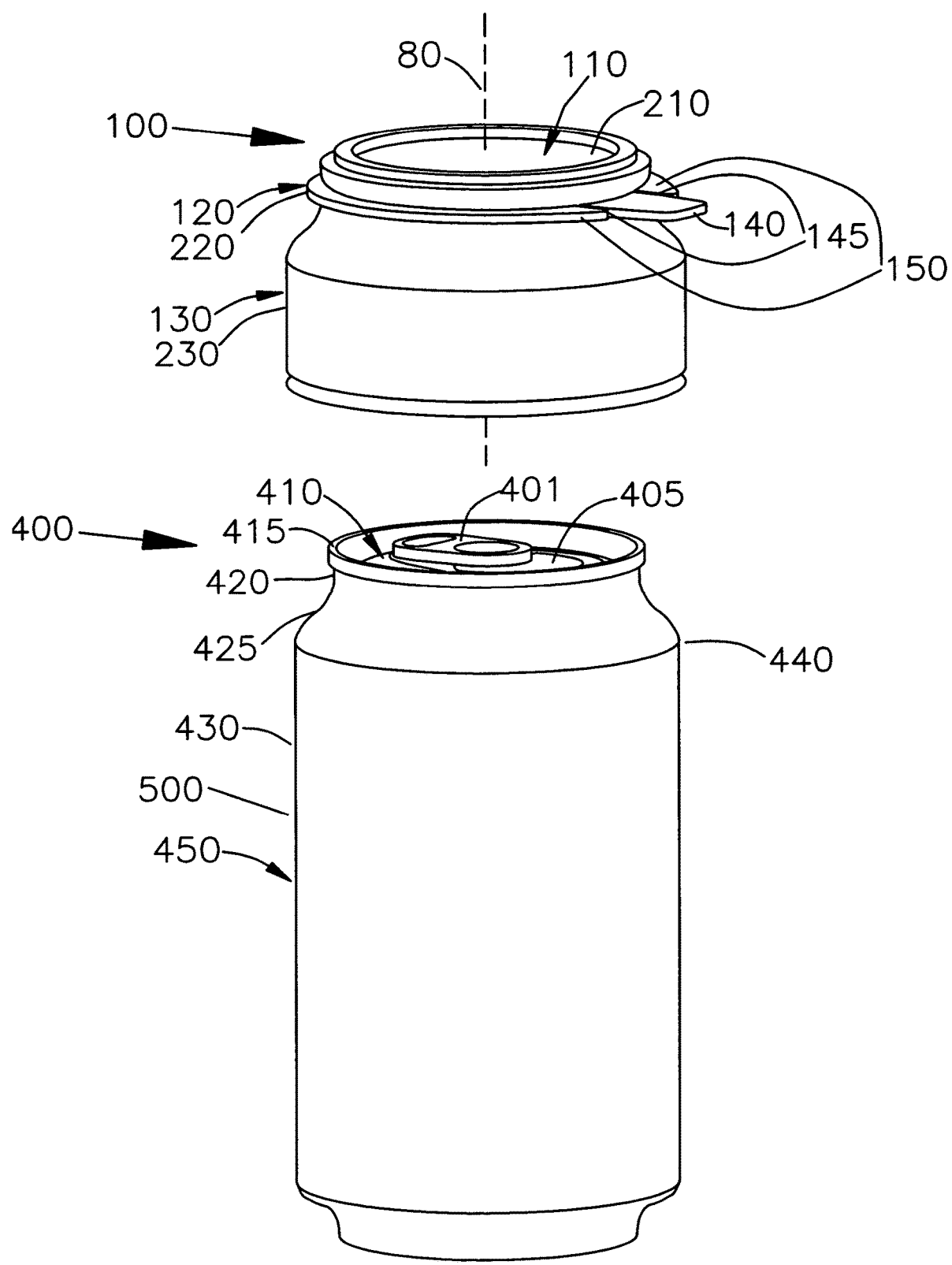
FIG. 3 is another schematic illustration of both the cover of FIG. 1 and the beverage can of FIG. 2.

Reference is now made to FIG. 3 which shows the cover 100 juxtaposed opposite the beverage can 400. It is appreciated that a contour of the inner cover surface 300 (not shown in FIG. 3) of the cover 100 is fitted substantially to an upper contour of the outer can surface 500 of the beverage can 400. The cover top 110 is fitted over the can top 410. The skirt 130 is fitted substantially to cover the sloped area 425 and part of the outer cylindrical surface 430. The clasp ring 120 is positioned in the circular indentation 420. It is appreciated that by positioning the clasp ring 120 in the circular indentation 420, the cover top 110 may be attached loosely to the can top 410. It is also appreciated that by positioning the clasp ring 120 in the circular indentation 420, the skirt 130 may be attached loosely to the sloped surface 425 and part of the outer cylindrical surface 430. It is also appreciated that by positioning the clasp ring 120 in the circular indentation 420, the clasp ring 120 may be snugly attached to the circular indentation 420.

Figure 4:
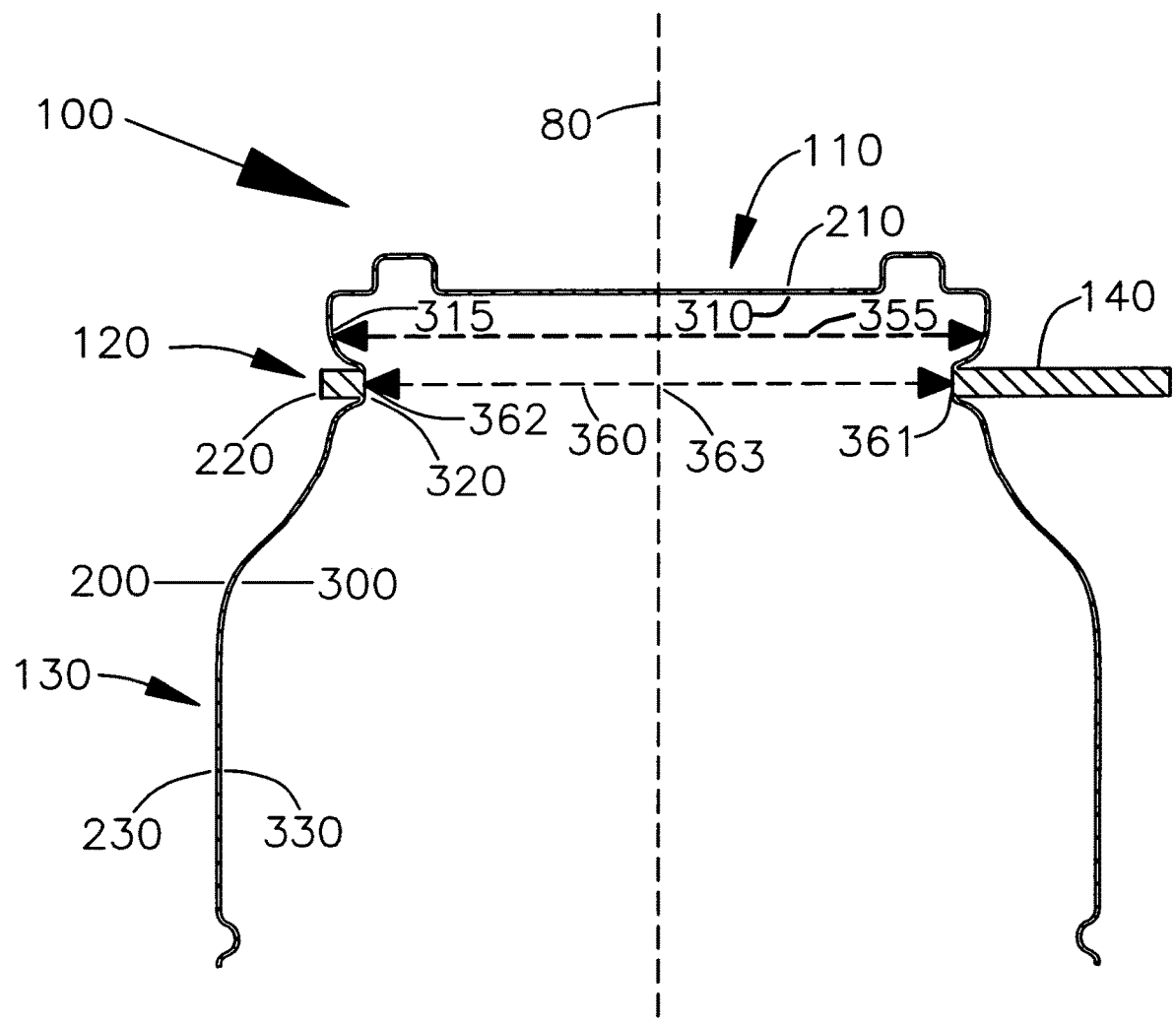
FIG. 4 is a cross-sectional view along lines 85; 85 of FIG. 1.

Reference is now made to FIG. 4 which is a cross-section along lines 85; 85 of FIG. 1. FIG. 4 views the cover 100 as fitted substantially to the beverage can 400 (not shown in FIG. 4). As disclosed above, the outer cover-top surface 210, the outer clasp-ring surface 220, and the outer skirt surface 230 are included in the outer cover surface 200. As disclosed above, the inner cover-top surface 310, the circular inner clasp-ring surface 320, and the inner skirt surface 330 are included in the inner cover surface 300. As disclosed above, the circular inner clasp-ring surface 320 is positioned below the inner cover-top surface 310. As disclosed above, the inner skirt surface 330 is positioned below the circular inner clasp-ring surface 320. As disclosed above, the circular inner clasp-ring surface 320 is contiguous with the inner cover-top surface 310. As disclosed above, the inner skirt surface 330 is contiguous with the circular inner clasp-ring surface 320. It is appreciated that the cover top 110, the clasp ring 120, and the skirt 130 all share a single contiguous inner surface that generally conforms to the upper contour of the outer can surface 500 of the beverage can 400. The circular inner clasp-ring surface 320 bulges inwardly, such that when the clasp ring 120 is fitted to the circular indentation 420, the circular inner clasp-ring surface 320 prevents the cover 100 from being lifted off the beverage can 400 without damaging the integrity of the clasp ring 120. As disclosed above, the cover top 110 includes the outer cover-top surface 210 and the inner cover-top surface 310. The inner cover-top surface 310 further includes a circular internal surface 315, wherein the circular internal surface 315 has an internal diameter 355. Wherein the internal diameter 355 is at least as large as the first outer can diameter 455. The circular internal surface 315 is positioned around the circular seam 415 when the cover 100 is disposed on the beverage can 400. As disclosed above, the clasp ring 120 includes the outer clasp-ring surface 220 and the circular inner clasp-ring surface 320. The circular inner clasp-ring surface 320 has an inner clasp-ring diameter 360. The inner clasp-ring diameter 360 has a first clasp-ring endpoint 361 and a second clasp-ring endpoint 362. The inner clasp-ring diameter 360 has a center point 363. The circular inner clasp-ring surface 320 is disposed below and in proximity to the circular internal surface 315. The inner clasp-ring diameter 360 is smaller than the internal diameter 355 of the circular internal surface 315 of the inner cover-top surface 310 of the cover top 110. The inner clasp-ring diameter 360 is at least as large as the second outer can diameter 460 of the beverage can 400. The inner clasp-ring diameter 360 is smaller than the first outer can diameter 455 of the beverage can 400. The circular inner clasp-ring surface 320 is positioned around the circular indentation 420 of the beverage can 400 when the cover 100 is disposed on the beverage can 400. As disclosed above, the circular inner clasp-ring surface 320 including the center axis 80. Wherein the center axis 80 intersects the center point 363 of the inner clasp-ring diameter 360. Wherein, the center axis 80 is perpendicular to the inner clasp-ring diameter 360.

Figure 5A:
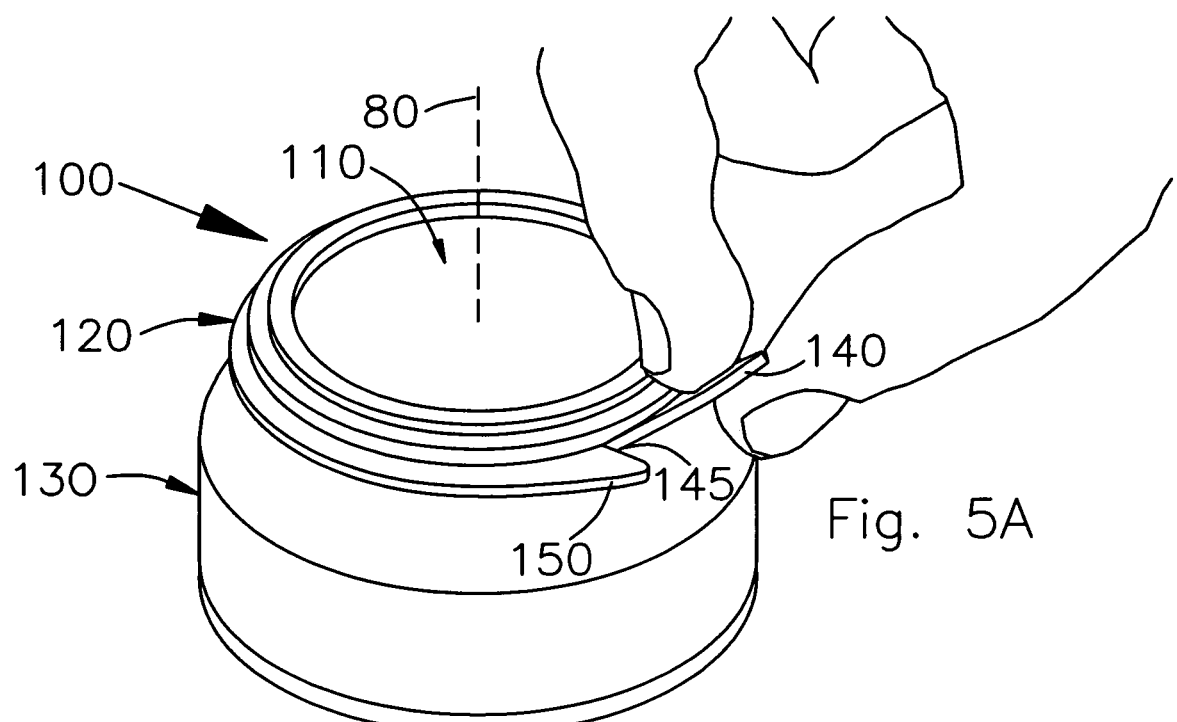
FIGS. 5A and 5B are schematic illustrations of both the cover of FIG. 1 and the beverage can of FIG. 2.
Figure 5B:
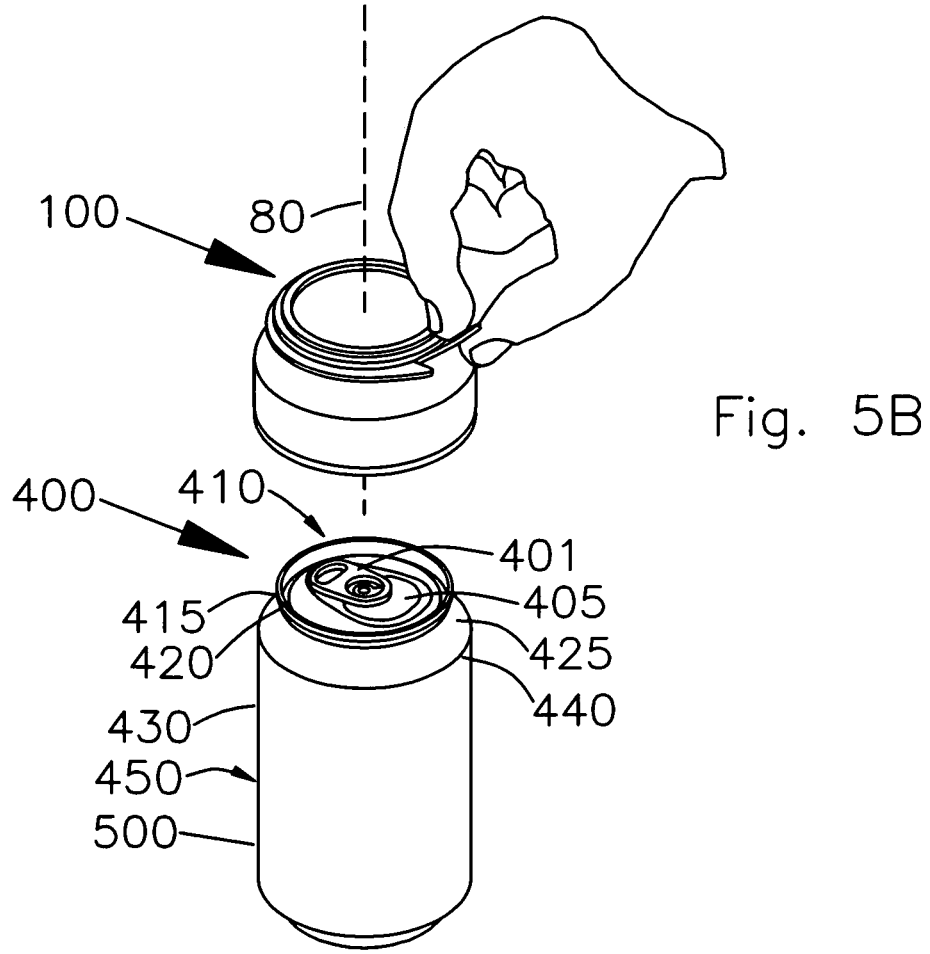

Reference now is made to FIG. 5A and FIG. 5B. FIG. 5A and FIG. 5B together illustrate the operation of the tamper-evident functionality of the cover 100. As shown in FIG. 5A and FIG. 5B, a user pulls the movable seal tab 140 upwards, which causes the movable seal tab 140 to break away from the seal stubs 150 along the tear lines 145. Once the movable seal tab 140 is separated from the seal stubs 150, the clasp ring 120 no longer provides sufficient resistance to pulling the cover 100 off the beverage can 400. It is appreciated that the clasp ring 120 may be formed of a semi-rigid plastic that may be flexible enough to be pulled above the circular seam 415 once the movable seal tab 140 is separated from the seal stubs 150. It is similarly appreciated, however, that the act of pulling the cover 100 off the beverage can 400 causes the tear lines 145 to tear if not done previously.

As disclosed above, it is appreciated that the tear lines 145 extends to the inner cover surface 300 (FIG. 4). Accordingly, the integrity of the inner cover surface 300 will not be affected even if a tamper-evident event has occurred, i.e., the movable seal tab 140 has separated from the seal stubs 150. Therefore, as opposed to a typical tamper-evident seal, the cover 100 can be reused to protect the drinking area 440 of the beverage can 400. It is appreciated that, when the cover 100 is disposed on the beverage can 400, the cover 100 is able to protect the drinking area 440 of the beverage can 400 in any position in which the cover 100 may be position after turning the cover 100 around the center axis 80. It is also appreciated that, after the cover 100 is redisposed on the beverage can 400, the protection of the drinking area 440 may be restored in any position in which the cover 100 may be positioned in relation to the drinking aperture 405 of the beverage can 400.

It is be appreciated that the cover 100 may be used to cover the drinking aperture 405, if the user does not drink all of the contents of the beverage can 400. In such a manner, the cover 100 is used to cover the drinking aperture 405. It is appreciated that in a typical beverage can, once the push-top tab 401 is used to open the drinking aperture 405, the push-top tab 401 cannot be reclosed. Accordingly, it is also appreciated that while the cover 100 may not necessarily provide a hermetic seal for the drinking aperture 405 when the drinking aperture 405 is open and the cover 100 is disposed on the beverage can 400, the cover 100 may still provide a measure of hygienic protection by impeding the entry of germs and/or other contaminants into the contents of the beverage can 400 regardless of the state of the movable seal tab 140. It is further appreciated that the beverage cans 400 are often used for carbonated beverage cans. Once the beverage cans 400 are opened, the level of carbonation in such beverages typically starts to go down. A reusable cover such as the cover 100 may serve to impede carbonation loss in previously opened beverage cans 400. It is also appreciated that when drinking from the beverage can 400, the drinker's lips typically come into contact with at least portions of the can top 410, the circular seam 415, the circular indentation 420, the sloped surface 425, and the outer cylindrical surface 430. The cover 100 may prevent contamination of these areas both before and after the beverage can 400 is initially opened and the movable seal tab 140 is separated from the seal stubs 150. It is appreciated that as depicted in FIG. 1, the cover 100 is configured to generally conform to a top of the beverage can 400.

Figure 6A:
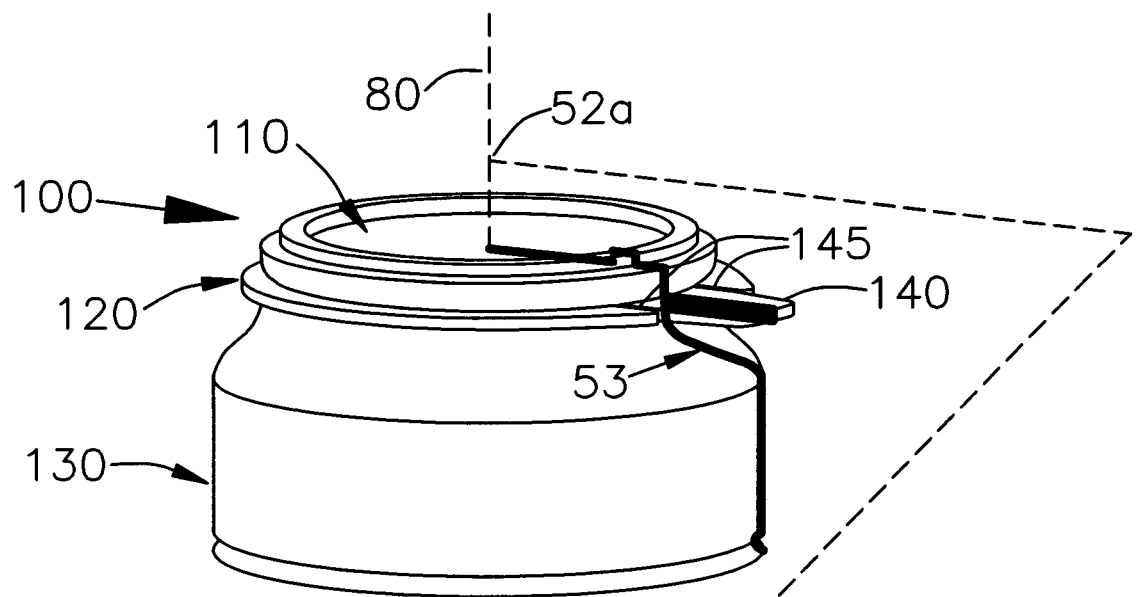
FIGS. 6A and 6B are schematic illustrations of a one structural aspect of the cover of FIG. 1.
Figure 6B:
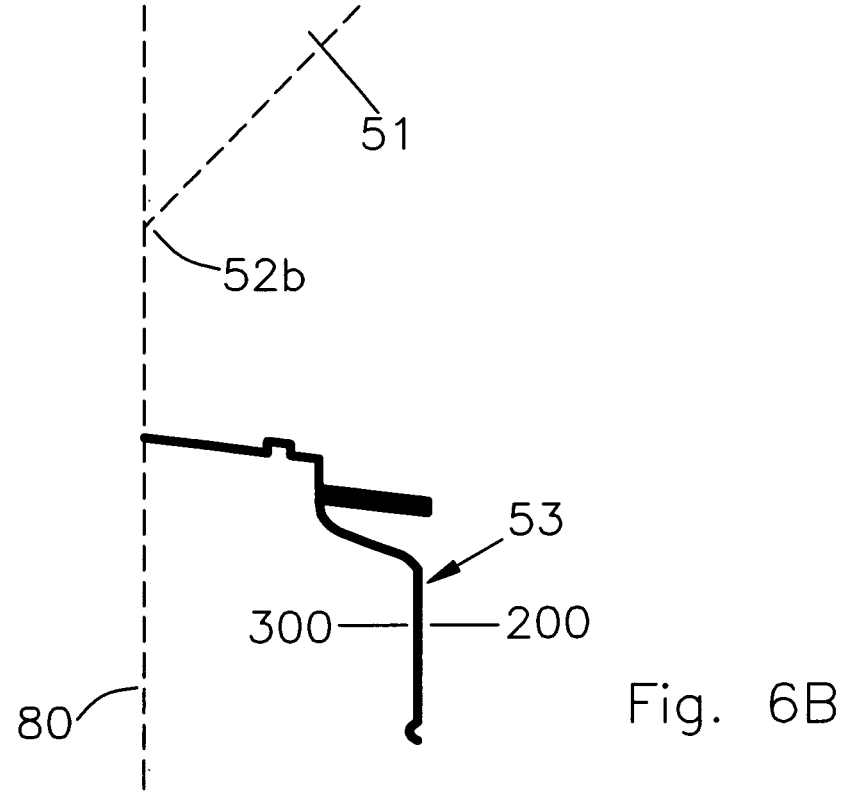

Reference now is made to FIG. 6A and FIG. 6B. FIG. 6A and FIG. 6B together illustrate schematically how the skirt 130 relates structurally to the at least one tamper-evident seal of the cover 100. FIG. 6A is a schematic perspective view that illustrates the skirt 130 is attached with the at least one tamper-evident seal such that: a virtual, continuous, two-dimensional triangle 51 has a first corner 52a and a second corner 52b, wherein the first corner 52a and the second corner 52b lie on the center axis 80, wherein the virtual, continuous, two-dimensional triangle 51 intersects both the skirt 130 and the movable seal tab 140 at an intersection 53, wherein the intersection 53 is continuous along an entirety of the intersection 53. FIG. 6A illustrates that the intersection 53 is continuous along the entirety of the intersection 53. FIG. 6B relates to FIG. 6A and is a schematic perspective view that illustrates only the intersection 53 of FIG. 6A. FIG. 6B illustrates that the intersection 53 is continuous along the entirety of the intersection 53.

Figure 7:
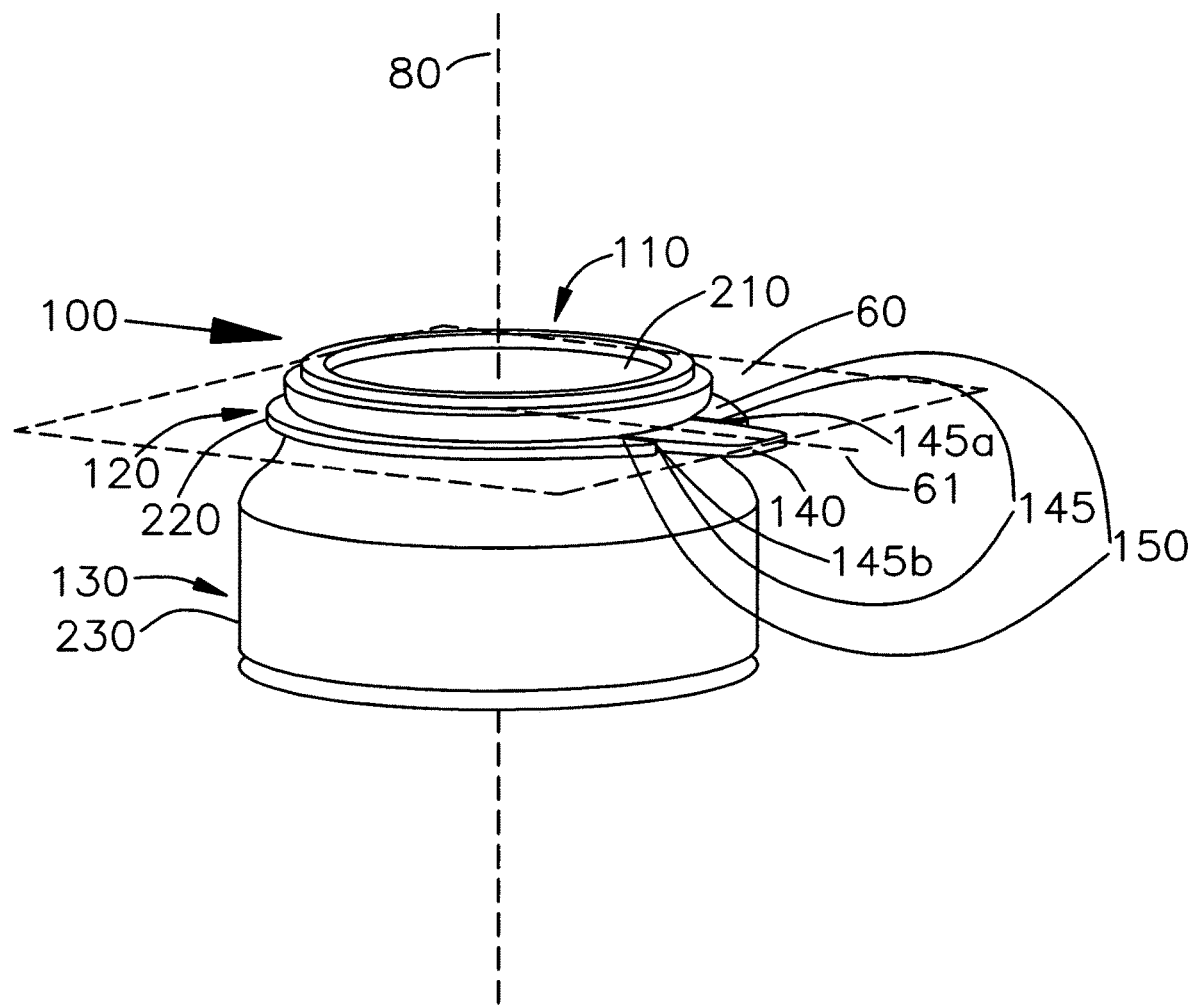
FIG. 7 is a schematic illustration of another structural aspect of the cover of FIG. 1.

Reference now is made to FIG. 7, which is a schematic perspective view that illustrates schematically how in the cover 100 the at least one tamper-evident seal relates structurally to the outer cover-top surface 210 and the outer skirt surface 230. FIG. 7 illustrates the at least one tamper-evident seal is externally disposed from the outer cover-top surface 210 and the outer skirt surface 230 such that the movable seal tab 140, the two tear lines 145, and the two seal stubs 150 extend: (A) from the clasp ring 120 outwardly away from the center axis 80; (B) from a region of the outer cover-top surface 210 and a region of the outer skirt surface 230 substantially adjacent to the clasp ring 120; (C) in parallel to a virtual, continuous, two-dimensional plane 60 that is at least substantially perpendicular to the center axis 80, wherein the virtual, continuous, two-dimensional plane 60 has an in-plane axis 61 intersecting the center axis 80; and (D) at least substantially in parallel to the in-plane axis 61, wherein the virtual, continuous, two-dimensional plane 60 intersects the two tear lines 145, and wherein the in-plane axis 61 is equidistant from the first tear line 145a and from the second tear line 145b.

Figure 8A:
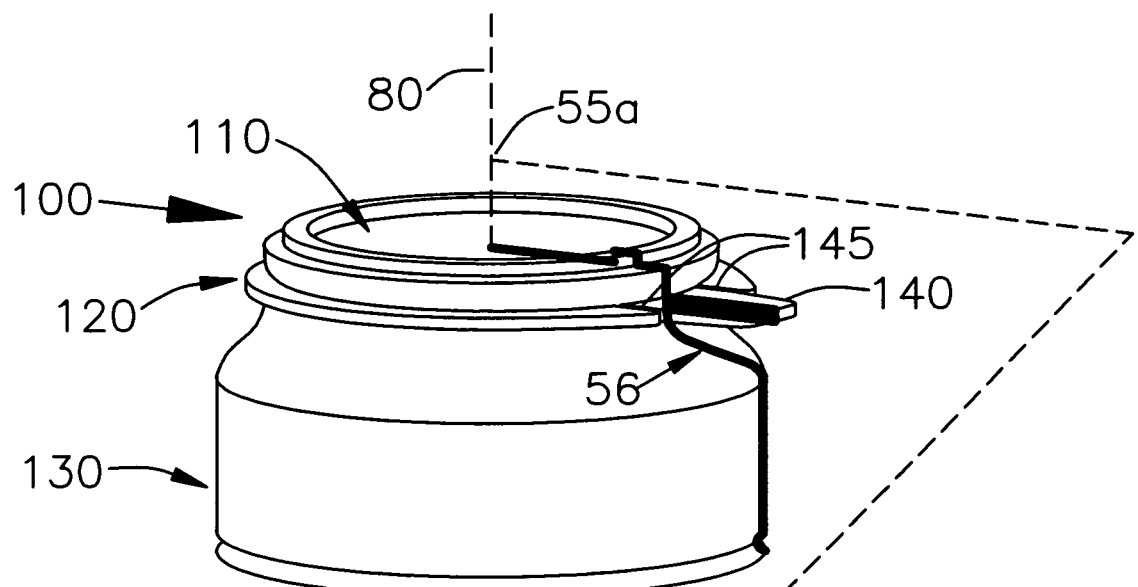
FIGS. 8A and 8B are schematic illustrations of another structural aspect of the cover of FIG. 1.
Figure 8B:
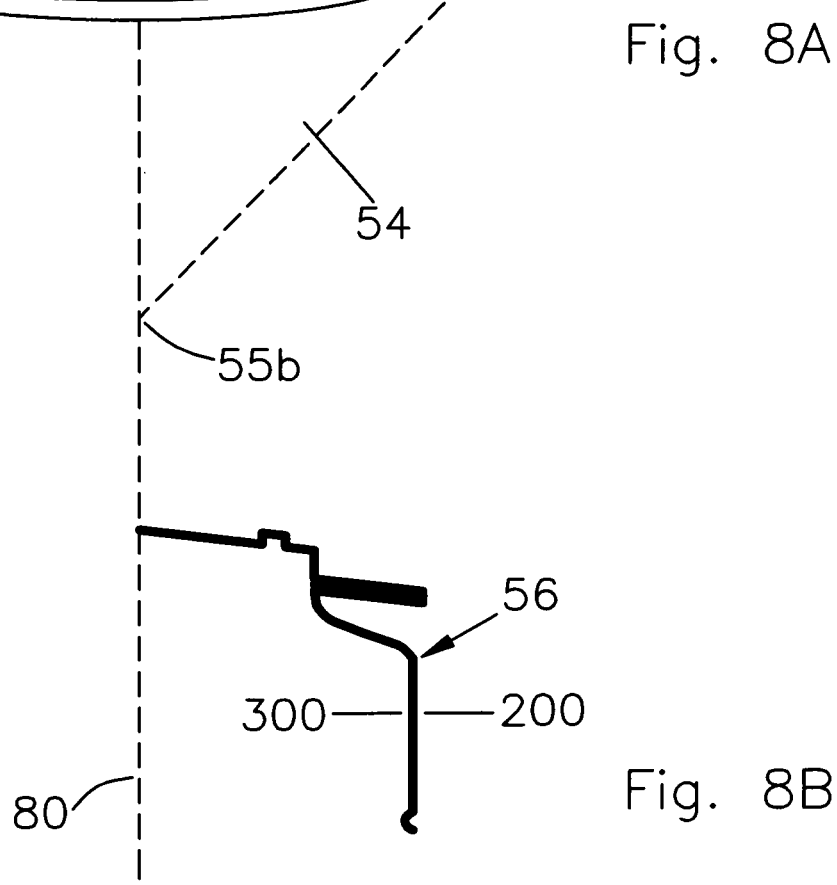

Reference now is made to FIG. 8A and FIG. 8B. FIG. 8A and FIG. 8B together illustrate schematically how the skirt 130 relates structurally to the clasp ring 120, wherein the skirt 130 extends 360 degrees around the center axis 80 and along the clasp ring 120. FIG. 8A is a schematic perspective view that illustrates the skirt 130 extends 360 degrees around the center axis 80 and along the clasp ring 120, and wherein the inner skirt surface 330 is contiguous, 360 degrees around the center axis 80, with the circular inner clasp-ring surface 320 such that a given, virtual, continuous, two-dimensional triangle 54 has a first given corner 55a and a second given corner 55b, wherein the first given corner 55a and the second given corner 55b lie on the center axis 80, wherein the given, virtual, continuous, two-dimensional triangle 54 intersects both the skirt 130 and the clasp ring 120 at a resulting intersection 56, wherein the resulting intersection 56 is continuous along an entirety of the resulting intersection 56. FIG. 8A illustrates that the resulting intersection 56 is continuous along the entirety of the resulting intersection 56. FIG. 8B relates to FIG. 8A and is a schematic perspective view that illustrates only the resulting intersection 56 of FIG. 8A. FIG. 8B illustrates that the resulting intersection 56 is continuous along the entirety of the resulting intersection 56.

Figure 9A:
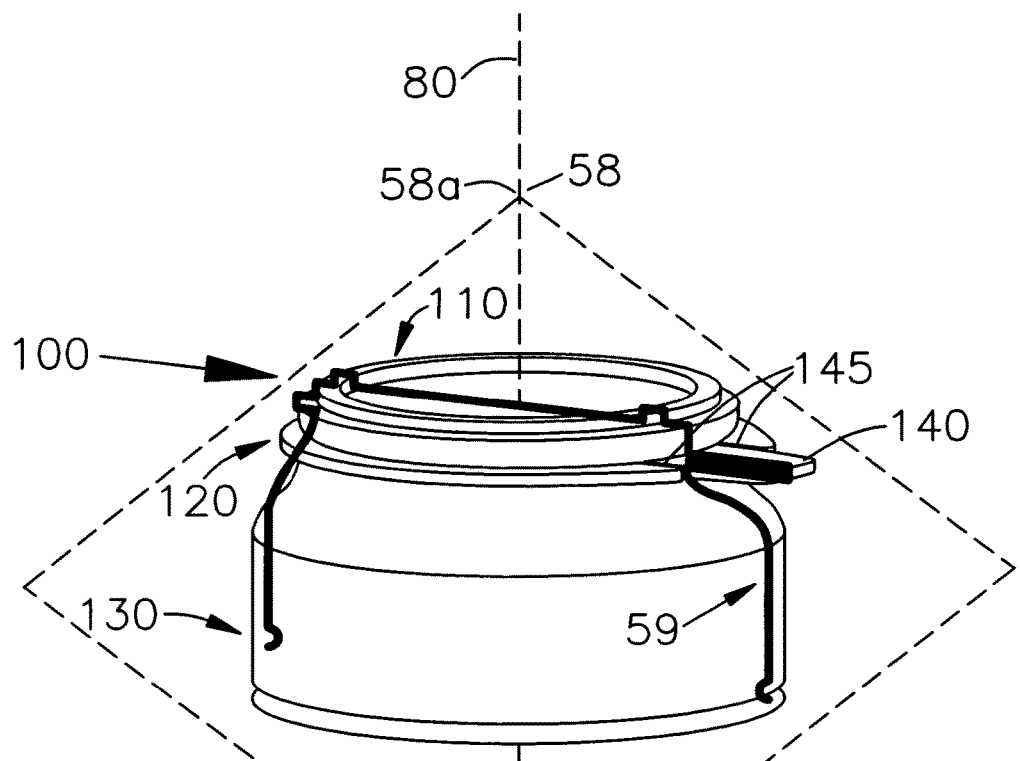
FIGS. 9A and 9B are schematic illustrations of another structural aspect of the cover of FIG. 1.
Figure 9B:
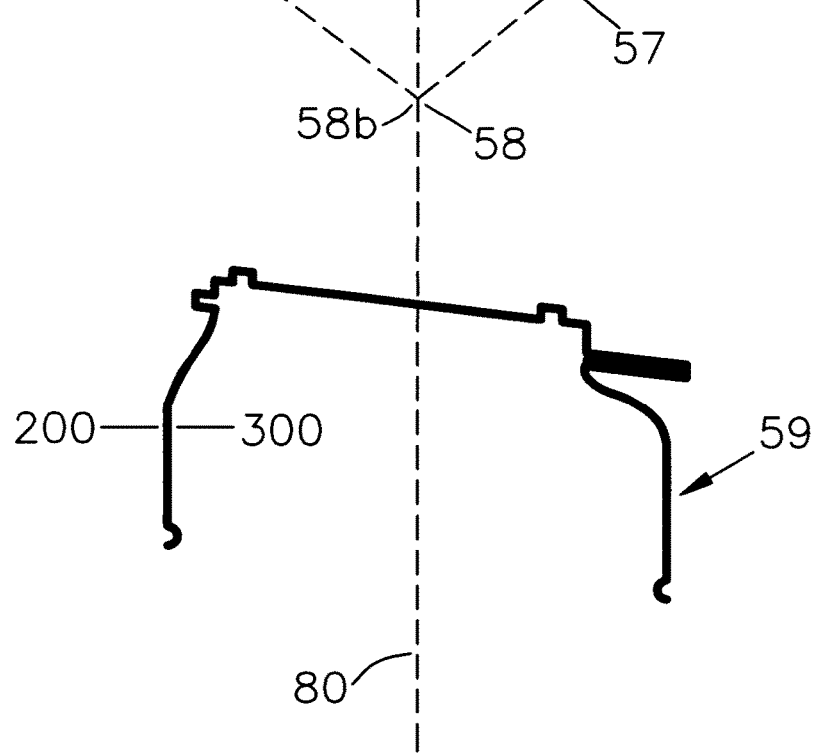

Reference now is made to FIG. 9A and FIG. 9B. FIG. 9A and FIG. 9B together illustrate schematically a structural aspect of the cover 100 that relates to the continuation of the inner cover surface 300, wherein the skirt 130 extends 360 degrees around the center axis 80 and along the clasp ring 120. FIG. 9A is a schematic perspective view that illustrates the skirt 130 extends 360 degrees around center axis 80 and along clasp-ring 120, wherein the inner cover surface 300 is continuous such that a virtual, continuous, two-dimensional rectangle 57 has two opposing corners 58 including a first opposing corner 58a and a second opposing corner 58b, wherein the first opposing corner 58a and the second opposing corner 58b lie on the center axis 80, wherein the virtual, continuous, two-dimensional rectangle 57 intersects the inner cover surface 300 at an inner intersection 59, wherein the inner intersection 59 is continuous along an entirety of the inner intersection 59. FIG. 9A illustrates that the inner intersection 59 is continuous along the entirety of the inner intersection 59. FIG. 9B relates to FIG. 9A and is a schematic perspective view that illustrates only the inner intersection 59 of FIG. 9A. FIG. 9B illustrates that the inner intersection 59 is continuous along the entirety of the inner intersection 59.

Reference now is made to FIG. 10A and FIG. 10B. FIG. 10A and FIG. 10B together illustrate schematically a structural aspect of cover 100 that relates to a wall thickness of the cover top 110. FIG. 10A is perspective view of the cover 100. FIG. 10B is a cross section along lines 86; 86 of FIG. 10A. FIG. 10B of the drawings illustrates schematically that: a first distance 31 from any first point 1 lying on the inner cover-top surface 310 to any second point 2 lying on the outer cover-top surface 210 is at least substantially equal to a second distance 32 from any third point 3 lying on the outer cover-top surface 210 to any fourth point 4 lying on the inner cover-top surface 310, wherein the any second point 2 is nearest to the any first point 1, and wherein the any fourth point 4 is nearest to the any third point 3. It is appreciated that the wall thickness of the cover-top 110 may be minimal.

Reference now is made to FIG. 11A and FIG. 11B. FIG. 11A and FIG. 11B together illustrate schematically a structural aspect of the cover 100 that relates to a wall thickness of the skirt 130. FIG. 11A is perspective view of the cover 100. FIG. 11B is a cross section along lines 87; 87 of FIG. 11A. FIG. 11B of the drawings illustrates schematically that: a third distance 33 from any fifth point 5 lying on the inner skirt surface 330 to any sixth point 6 lying on the outer skirt surface 230 is at least substantially equal to a fourth distance 34 from any seventh point 7 lying on the outer skirt surface 230 to any eighth point 8 lying on the inner skirt surface 330, wherein the any sixth point 6 is nearest to the any fifth point 5, and wherein the any eighth point 8 is nearest to the any seventh point 7. It is appreciated that the wall thickness of the skirt 130 may be minimal.

Reference now is made to FIG. 12A and FIG. 12B. FIG. 12A and FIG. 12B together illustrate schematically a structural aspect of cover 100 that relates to a wall thickness of both the cover top 110 and the skirt 130. FIG. 12A is perspective view of the cover 100. FIG. 12B is a cross section along lines 88; 88 of FIG. 12A. FIG. 12B of the drawings illustrates schematically that a fifth distance 35 from any ninth point 9 lying on the inner cover-top surface 310 and the inner skirt surface 330 to any tenth point 10 lying on the outer cover-top surface 210 and the outer skirt surface 230 is at least substantially equal to a sixth distance 36 from any eleventh point 11 lying on the outer cover-top surface 210 and the outer skirt surface 230 to any twelfth point 12 lying on the inner cover-top surface 310 and the inner skirt surface 330, wherein the any tenth point 10 is nearest to the any ninth point 9, and wherein the any twelfth point 12 is nearest to the any eleventh point 11. It is appreciated that the wall thickness of the cover-top 110 and the skirt 130 may be minimal.

Figure 13A:
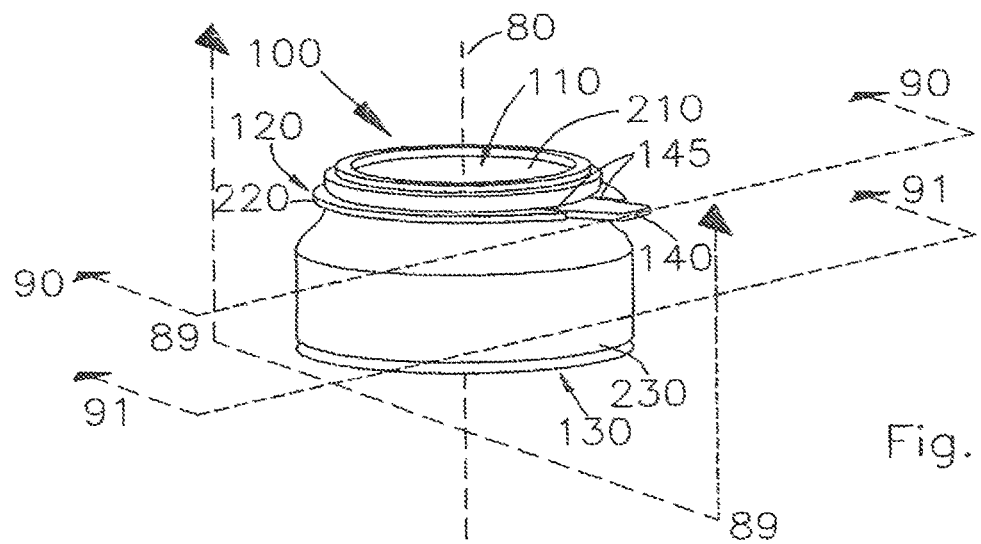
FIG. 13A-13D are schematic illustrations of another structural aspect of the cover of FIG. 1.
Figure 13B:
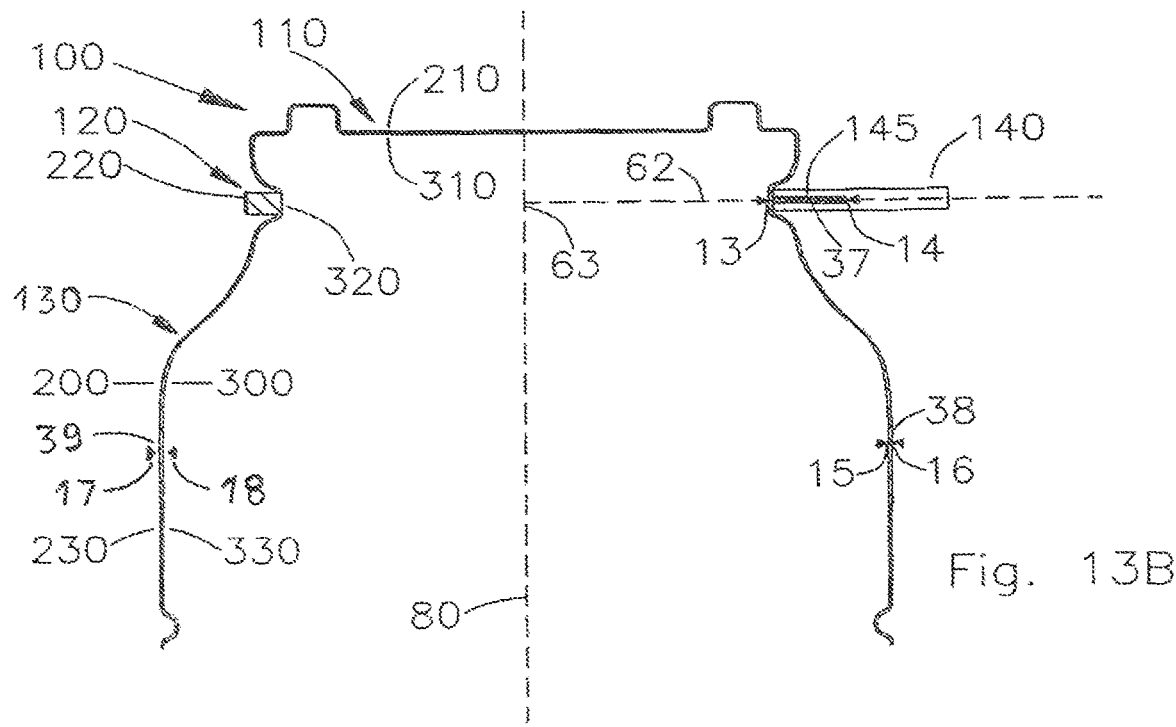
Figure 13C:
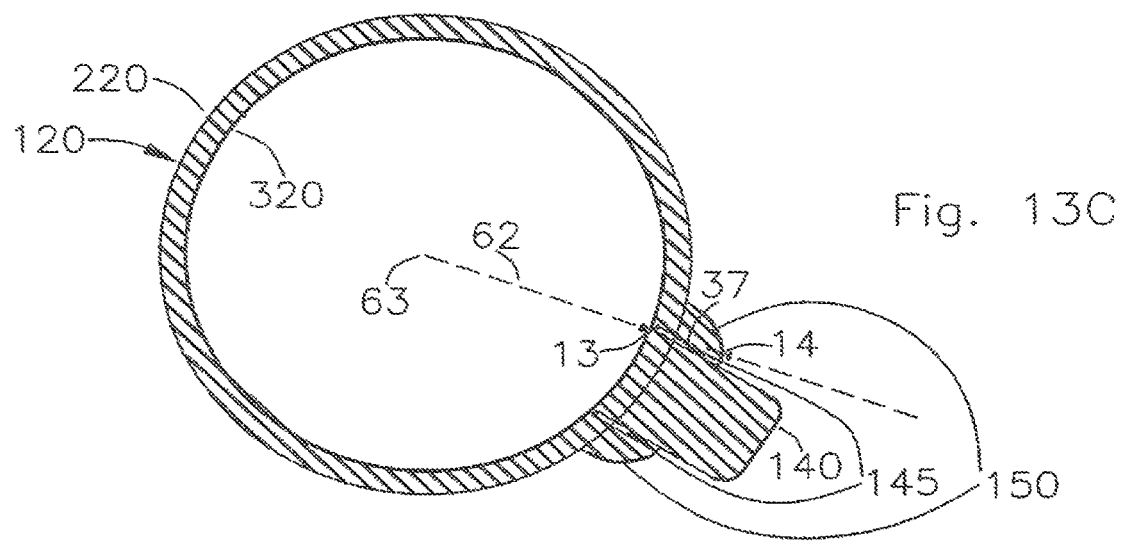
Figure 13D:
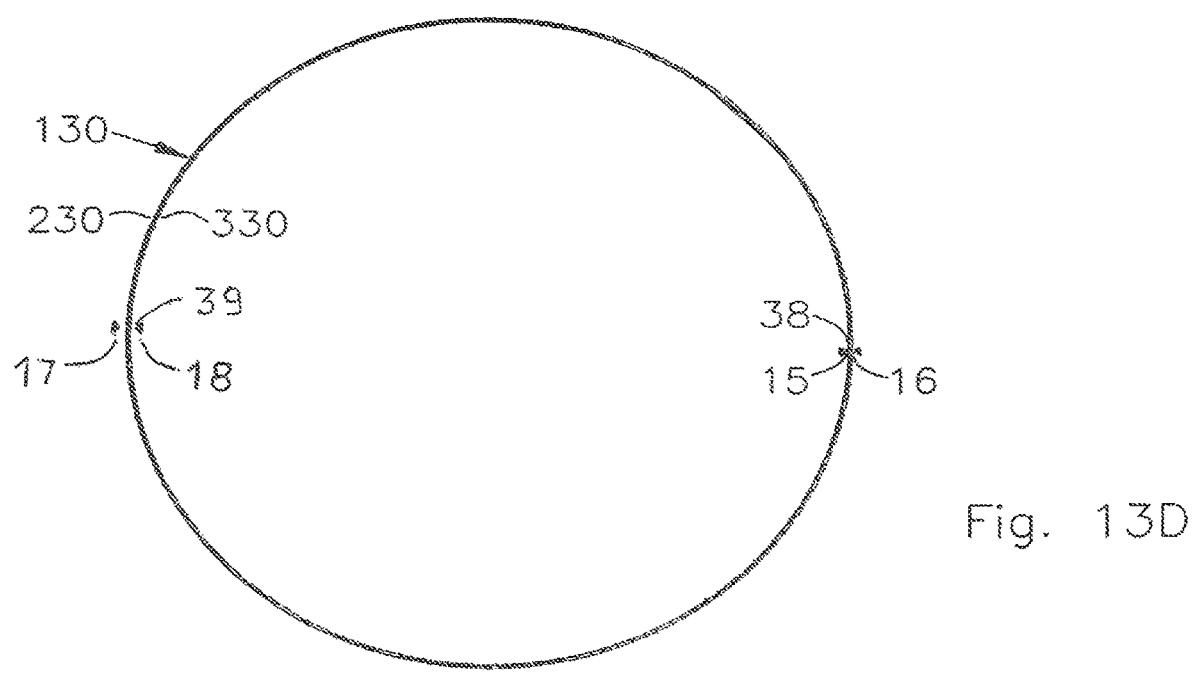

Reference now is made to FIG. 13A-13D. FIG. 13A-13D together illustrate schematically how in the cover 100 the tear lines 145 relate structurally to both the outer cover-top surface 210 and the outer skirt surface 230. FIG. 13A is a schematic perspective view. FIG. 13B illustrates a vertical section along lines 89; 89 of FIG. 13A. FIG. 13C illustrates a first horizontal section along lines 90; 90 of FIG. 13A. FIG. 13D illustrates a second horizontal section along lines 91; 91 of FIG. 13A.

FIG. 13A-13D illustrate that each of the two tear lines 145 is externally disposed from the outer cover-top surface 210 and the outer skirt surface 230 such that any thirteenth point 13 lying on the circular inner clasp-ring surface 320, and lying on a virtual, geometric ray 62, wherein the virtual, geometric ray 62 satisfies the criteria of: (E) the virtual, geometric ray 62 being straight one-dimensional object having one ray endpoint 63; (F) the virtual, geometric ray 62 being perpendicular to the center axis 80; (G) the one ray endpoint 63 lying on the center axis 80; and (H) the virtual, geometric ray 62 intersecting one of the two tear lines 145, wherein a seventh distance 37 from the any thirteenth point 13 to any fourteenth point 14 lying on the outer clasp-ring surface 220, and lying on the virtual, geometric ray 62, is greater than an eighth distance 38 and a ninth distance 39, wherein the eighth distance 38 is from any fifteenth point 15 lying on the inner cover-top surface 310 and the inner skirt surface 330 to any sixteenth point 16 lying on the outer cover-top surface 210 and the outer skirt surface 230, wherein the ninth distance 39 is from any seventeen point 17 lying on the outer cover-top surface 210 and the outer skirt surface 230 to any eighteen point 18 lying on the inner cover-top surface 310 and the inner skirt surface 330, wherein the any sixteenth point 16 is nearest to the any fifteenth point 15, and wherein the eighteen point 18 is nearest to the seventeen point 17. Wherein, the vertical section along the lines 89; 89 intersects the one of the two tear lines 145. Wherein, the first horizontal section along the lines 90; 90 intersects the one of the two tear lines 145. Wherein, the second horizontal section along the lines 91; 91 intersects the skirt 130.

Figure 14A:
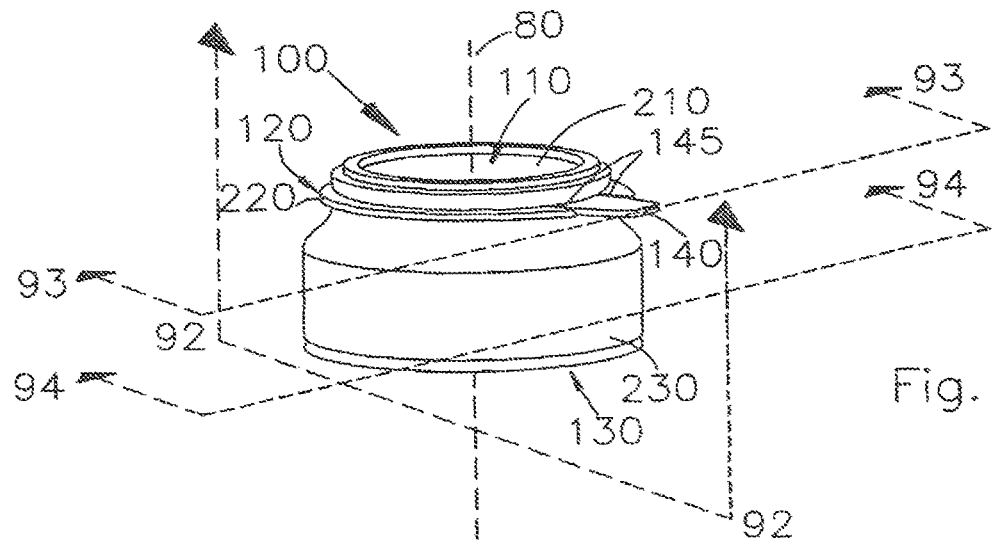
FIG. 14A-14D are schematic illustrations of another structural aspect of the cover of FIG. 1.
Figure 14B:
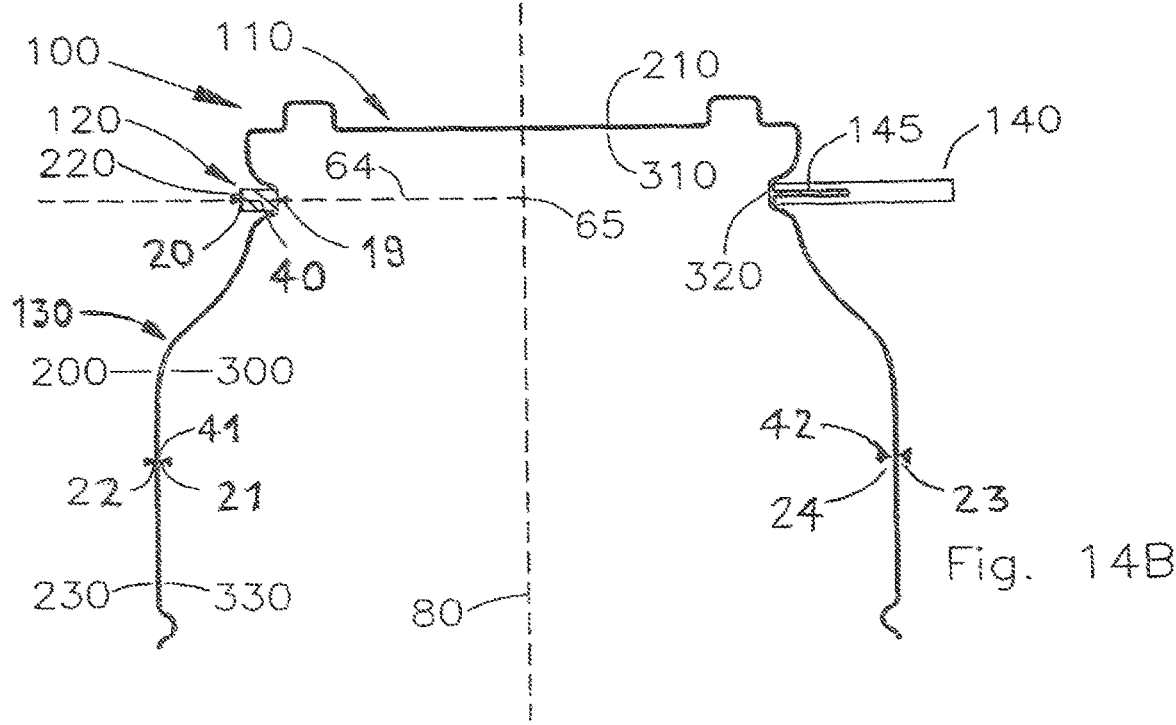
Figure 14C:
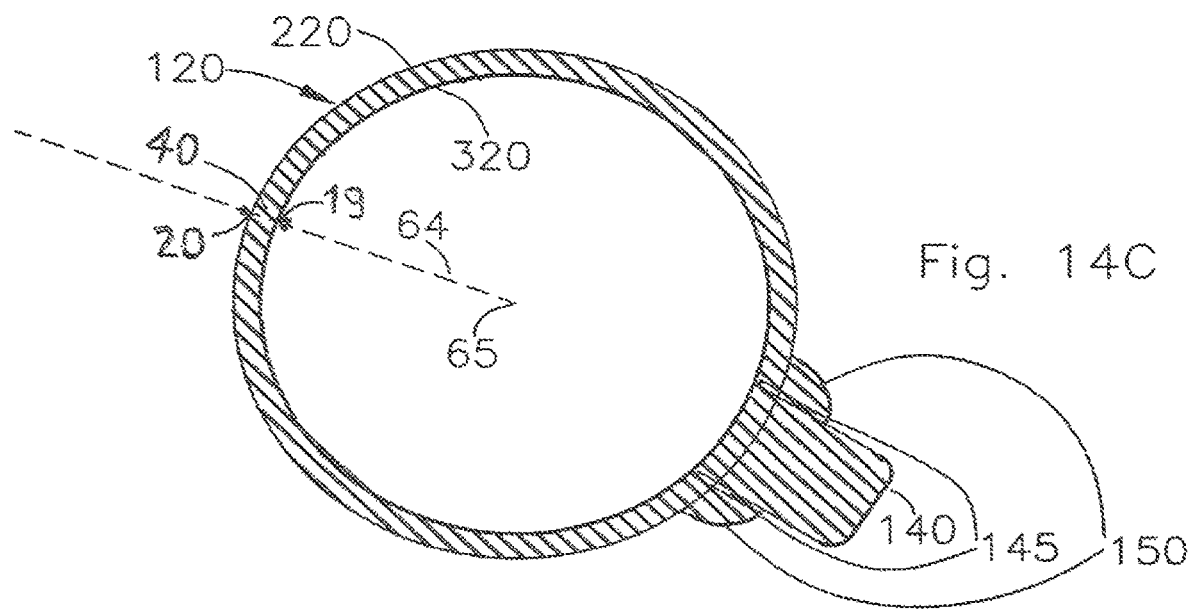
Figure 14D:
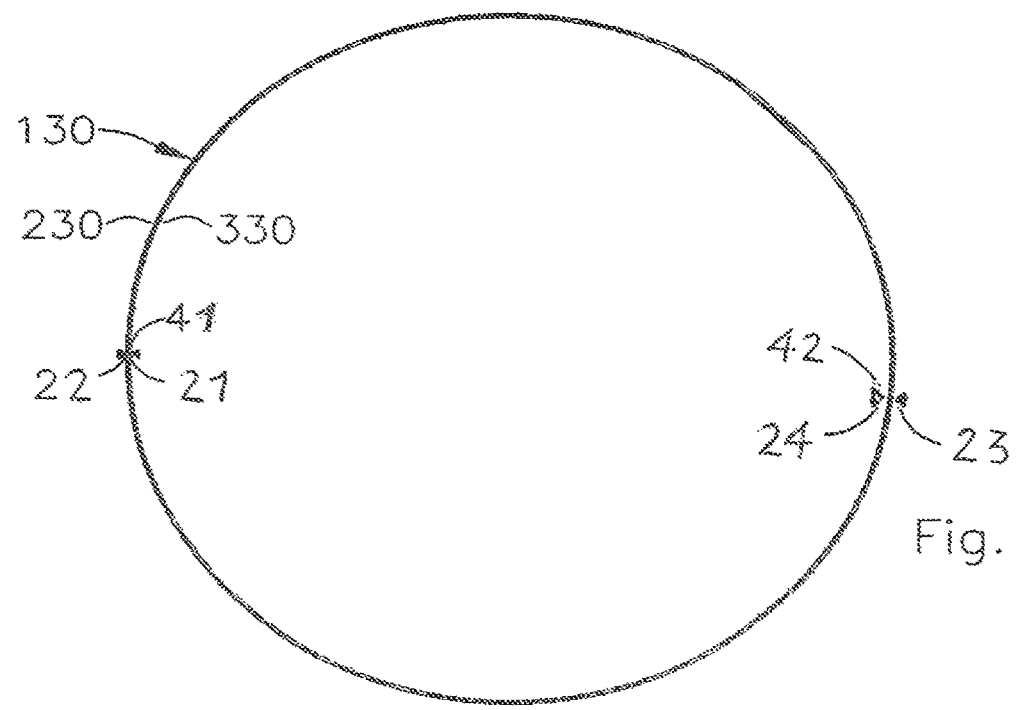

Reference now is made to FIG. 14A-14D. FIG. 14A-14D together illustrate schematically how the clasp ring 120 relates structurally to both the outer cover-top surface 210 and the outer skirt surface 230, wherein the clasp ring 120 is further externally disposed, 360 degrees around the center axis 80, from the outer cover-top surface 210 and the outer skirt surface 230. FIG. 14A is a schematic perspective view. FIG. 14B illustrates a vertical section along lines 92; 92 of FIG. 14A. FIG. 14C illustrates a first horizontal section along lines 93; 93 of FIG. 14A. FIG. 14D illustrates a second horizontal section along lines 94; 94 of FIG. 14A.

FIG. 14A-14D illustrate that the clasp ring 120 is further externally disposed, 360 degrees around the center axis 80, from the outer cover-top surface 210 and the outer skirt surface 230 such that any nineteenth point 19 lying on the circular inner clasp-ring surface 320, and lying on a given, virtual, geometric ray 64, wherein the given virtual, geometric ray 64 satisfies the criteria of: (iv) the given, virtual, geometric ray 64 being a straight one-dimensional object having a given, one, ray endpoint 65; (v) the given, virtual, geometric ray 64 being perpendicular to the center axis 80; (vi) the given one ray endpoint 65 lying on the center axis 80; and (vii) the given, virtual, geometric ray 64 intersecting the clasp ring 120, wherein a tenth distance 40 from the any nineteenth point 19 to any twenty point 20 lying on the outer clasp-ring surface 220, and lying on the given, virtual, geometric ray 64, is greater than an eleventh distance 41 and a twelfth distance 42, wherein the eleventh distance 41 is from any twenty-first point 21 lying on the inner cover-top surface 310 and the inner skirt surface 330 to any twenty-second point 22 lying on the outer cover-top surface 210 and the outer skirt surface 230, wherein the twelfth distance 42 is from any twenty-third point 23 lying on the outer cover-top surface 210 and the outer skirt surface 230 to any twenty-fourth point 24 lying on the inner cover-top surface 310 and the inner skirt surface 330, wherein the any twenty-second point 22 is nearest to the any twenty-first point 21, and wherein the any twenty-fourth point 24 is nearest to the any twenty-third point 23. Wherein, the vertical section along the lines 92; 92 intersects the clasp ring 120. Wherein, the first horizontal section along the lines 93; 93 intersects the clasp ring 120. Wherein, the second horizontal section along the lines 94; 94 intersects the skirt 130.

Reference now is made to FIG. 15A and FIG. 15B. FIG. 15A and FIG. 15B together illustrate schematically how in the cover 100 the circular inner clasp-ring 320 relates structurally to the inner skirt surface 330. FIG. 15A is a schematic perspective view. FIG. 15B illustrates a vertical section along lines 95; 95 of FIG. 15A. FIG. 15B illustrate the circular inner clasp-ring surface 320 further bulges inwardly such that any twenty-fifth point 25 lying on the inner skirt surface 330, and on a virtual, given, geometric ray 66, wherein the virtual, given, geometric ray 66 satisfies the criteria of: (iv) the virtual, given, geometric ray 66 being a straight one-dimensional object having one, given, ray endpoint 67; (v) the virtual, given, geometric ray 66 being perpendicular to the center axis 80; (vi) the one given ray endpoint 67 lying on the center axis 80; and (vii) the virtual, given, geometric ray 66 intersecting the inner skirt surface 330, wherein a thirteenth distance 43 from the any twenty-fifth point 25 to the one, given, ray endpoint 67, is greater than a fourteen distance 44 from the center point 363 to the first clasp-ring endpoint 361.

It is appreciated that by definition the internal diameter 355 of the circular internal surface 315 of the inner cover-top surface 310, the inner clasp-ring diameter 360 of the circular inner clasp-ring surface 320, the twelfth distance 42, and the eleventh distance 41, the inner cover-top surface 310, the circular inner clasp-ring surface 320, and the inner skirt surface 330, are distinguished morphologically one from another.

Figure 16:
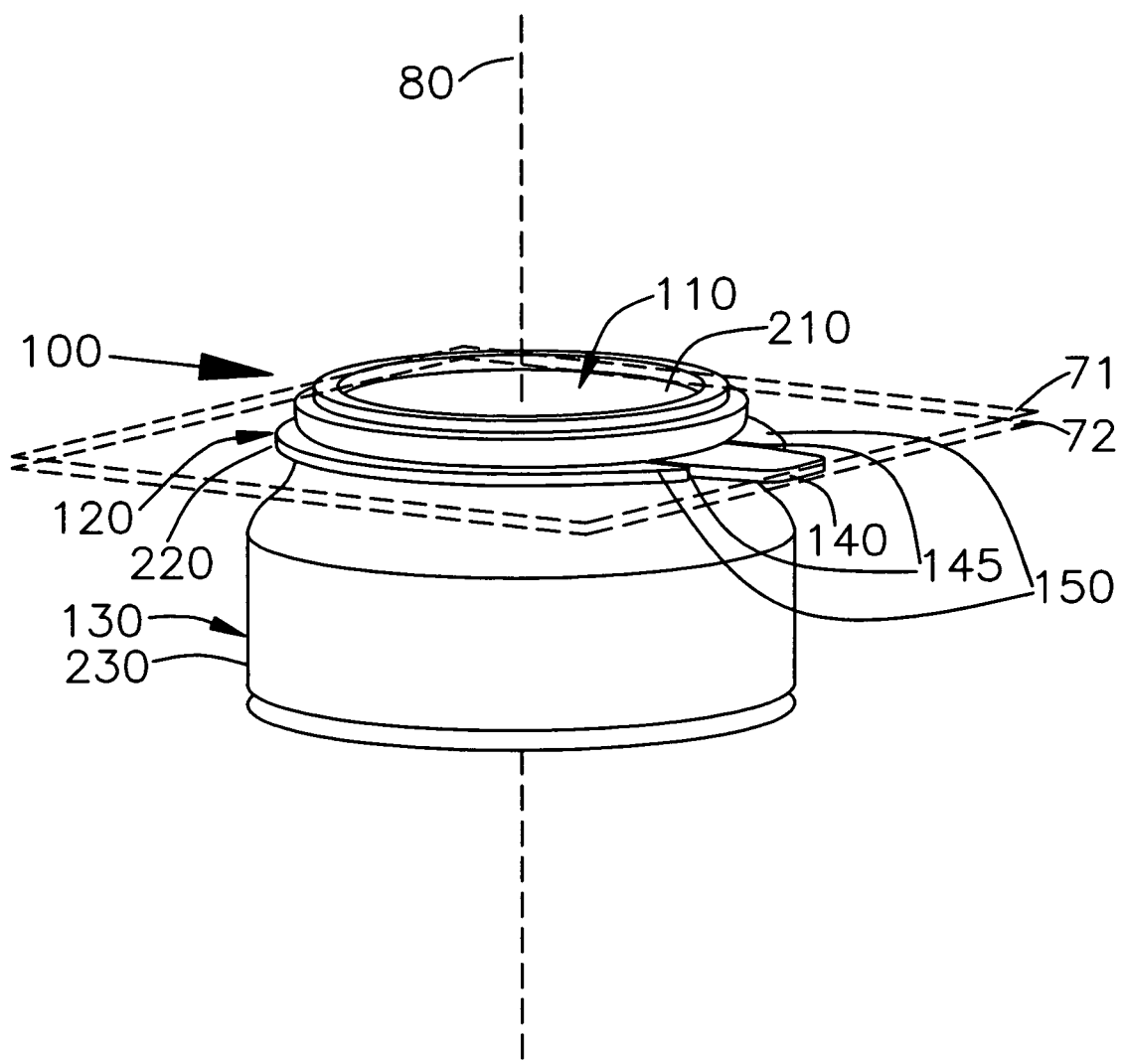
FIG. 16 is a schematic illustration of another structural aspect of the cover of FIG. 1.

Reference now is made to FIG. 16, which is a schematic perspective view that illustrates schematically further how in the cover 100 the at least one tamper-evident seal relates structurally to the outer cover-top surface 210 and the outer skirt surface 230. FIG. 16 illustrates the at least one tamper-evident seal is further externally disposed from the outer cover-top surface 210 and the outer skirt surface 230 such that the movable seal tab 140, the two tear lines 145, and the two seal stubs 150 extend between a first, virtual, continuous, two-dimensional plane 71 and a second, virtual, continuous, two-dimensional plane 72, wherein the first, virtual, continuous, two-dimensional plane 71 is at least substantially perpendicular to the center axis 80, wherein the second, virtual, continuous, two-dimensional plane 72 is parallel to the first virtual, continuous, two-dimensional plane 71, and wherein the second, virtual, continuous, two-dimensional plane 72 is positioned below and in proximity to the first, virtual, continuous, two-dimensional plane 71.

Figure 17:
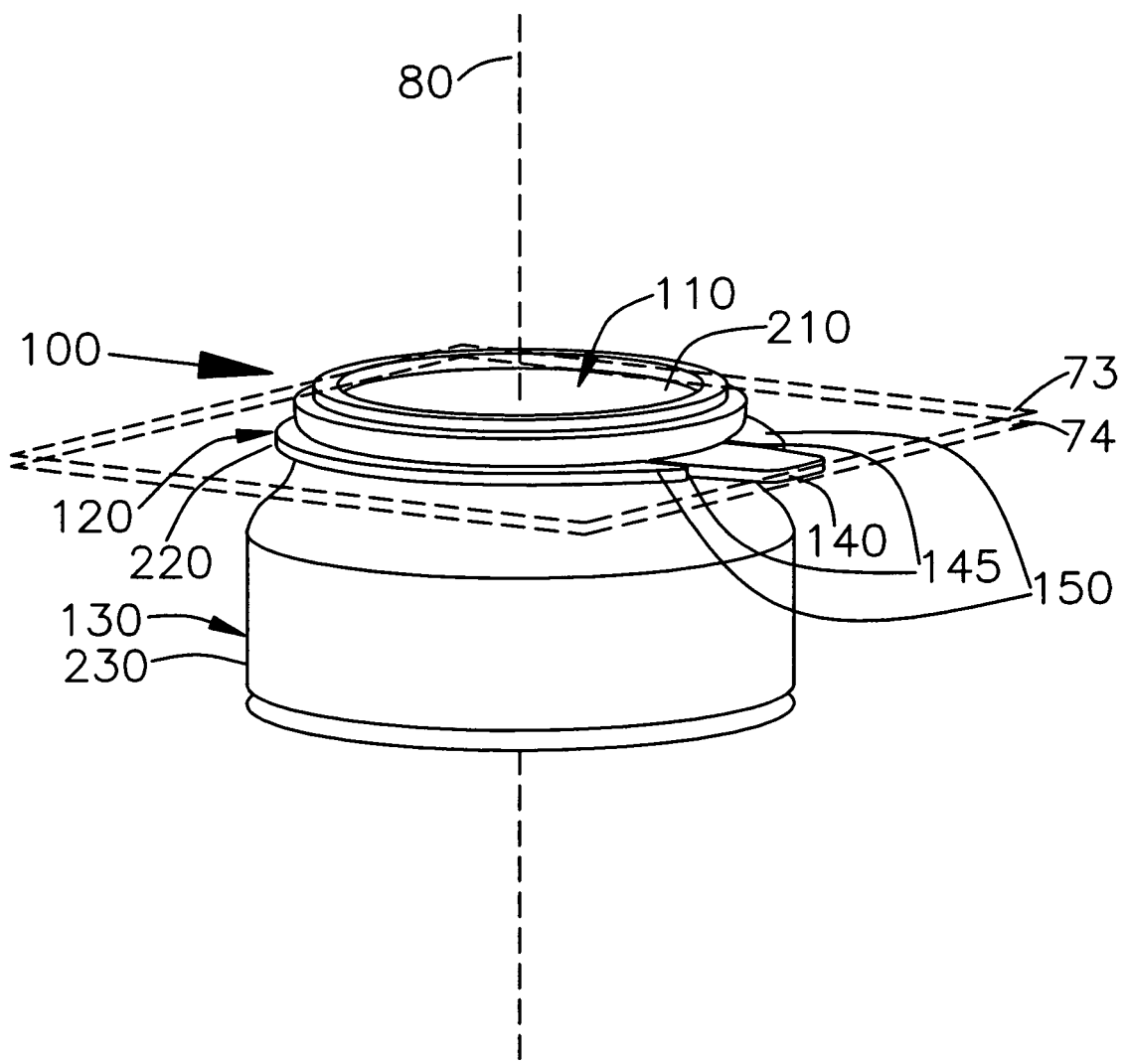
FIG. 17 is a schematic illustration of another structural aspect of the cover of FIG. 1.

Reference now is made to FIG. 17, which is a schematic perspective view that illustrates schematically further how in the cover 100 the clasp ring 120 relates structurally to the outer cover-top surface 210 and the outer skirt surface 230. FIG. 17 illustrates the clasp ring 120 extends between a third, virtual, continuous, two-dimensional plane 73 and a fourth, virtual, continuous, two-dimensional plane 74, wherein the third, virtual, continuous, two-dimensional plane 73 is at least substantially perpendicular to the center axis 80, wherein the fourth, virtual, continuous, two-dimensional plane 74 is parallel to the third virtual, continuous, two-dimensional plane 73, and wherein the fourth, virtual, continuous, two-dimensional plane 74 is positioned below and in proximity to the third, virtual, continuous, two-dimensional plane 73.

Figure 18:
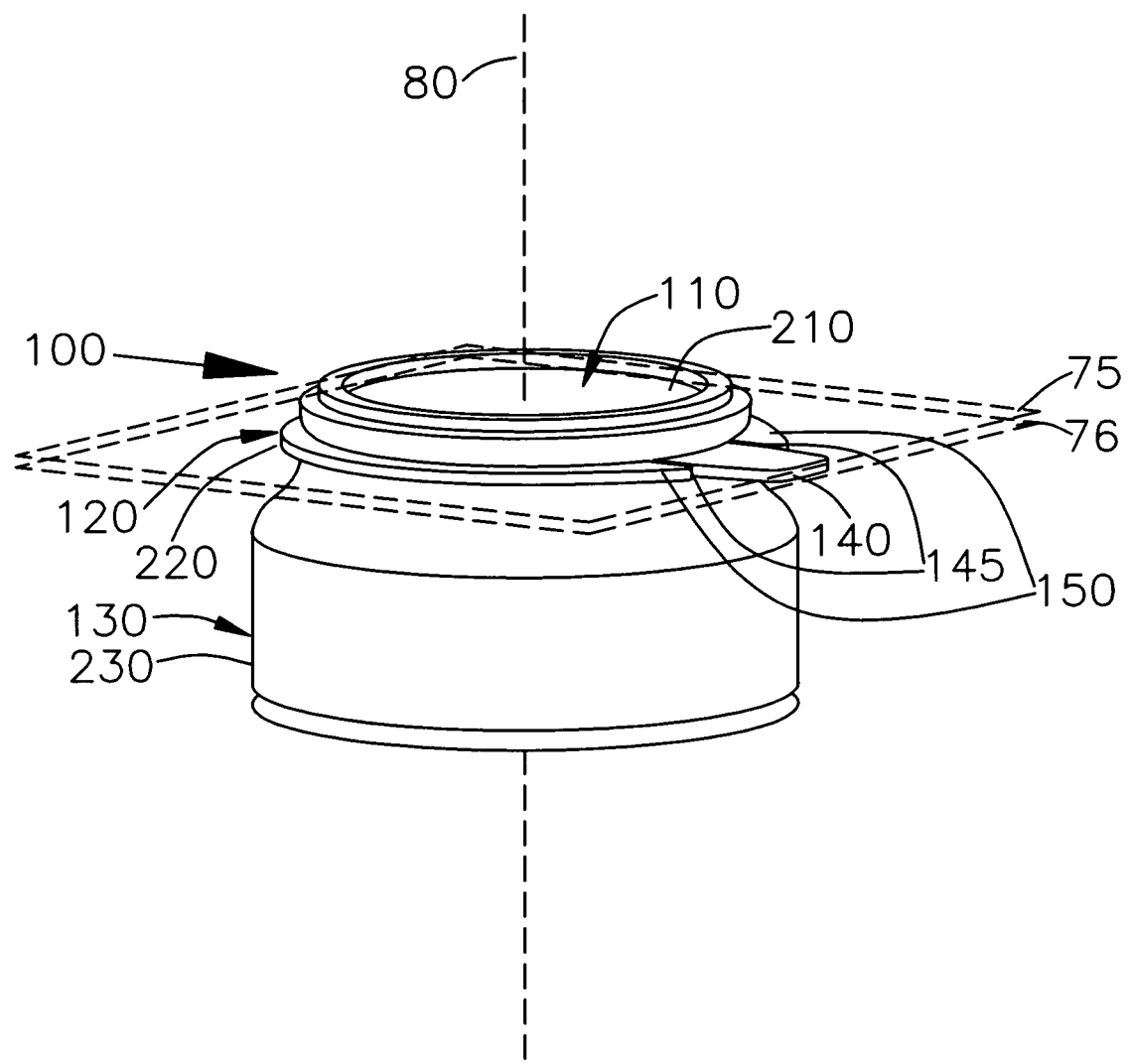
FIG. 18 is a schematic illustration of another structural aspect of the cover of FIG. 1.

Reference now is made to FIG. 18, which is a schematic perspective view that illustrates schematically further how in the cover 100 the clasp ring 120 relates structurally to the outer cover-top surface 210 and the outer skirt surface 230, wherein the clasp ring 120 is further externally disposed, 360 degrees around the center axis 80, from the outer cover-top surface 210 and the outer skirt surface 230. FIG. 17 illustrates the clasp ring 120 is further externally disposed, 360 degrees around the center axis 80, from the outer cover-top surface 210 and the outer skirt surface 230, wherein the clasp ring 120 extends between a fifth, virtual, continuous, two-dimensional plane 75 and a sixth, virtual, continuous, two-dimensional plane 76, wherein the fifth, virtual, continuous, two-dimensional plane 75 is at least substantially perpendicular to the center axis 80, wherein the sixth, virtual, continuous, two-dimensional plane 76 is parallel to the fifth virtual, continuous, two-dimensional plane 75, and wherein the sixth, virtual, continuous, two-dimensional plane 76 is positioned below and in proximity to the fifth, virtual, continuous, two-dimensional plane 75.

In a non-limiting exemplary embodiment of the invention, the cover 100 manufactured from plastic material in an industrial process known as Vacuum Forming. Vacuum Forming is a simplified version of thermoforming, whereby a sheet of plastic is heated to a forming temperature, stretched onto or into a single-surface mold, and held against a mold by applying a vacuum between the mold surface and the sheet. The vacuum-forming process is suitable for most product packaging. Relatively deep parts may be formed if the formable sheet is mechanically- or pneumatically-stretched prior to bringing the sheet in contact with the mold surface and before vacuum is applied. In some embodiments of the invention, conventional thermoplastics known in the art may be suitable materials for use in such a process. The cover 100 may be affixed to the beverage can 400 by softening and expanding the clasp ring 120 by applying heat, then positioning the cover 100 on the beverage can 400, and then applying pressure on the clasp ring 120, causing the clasp ring 120 to move downward. When the warmed area cools down, the clasp ring 120 tightens and wraps tightly around the circular indentation 420, thus implementing the tamper-evident functionality described hereinabove.

Figure 19:
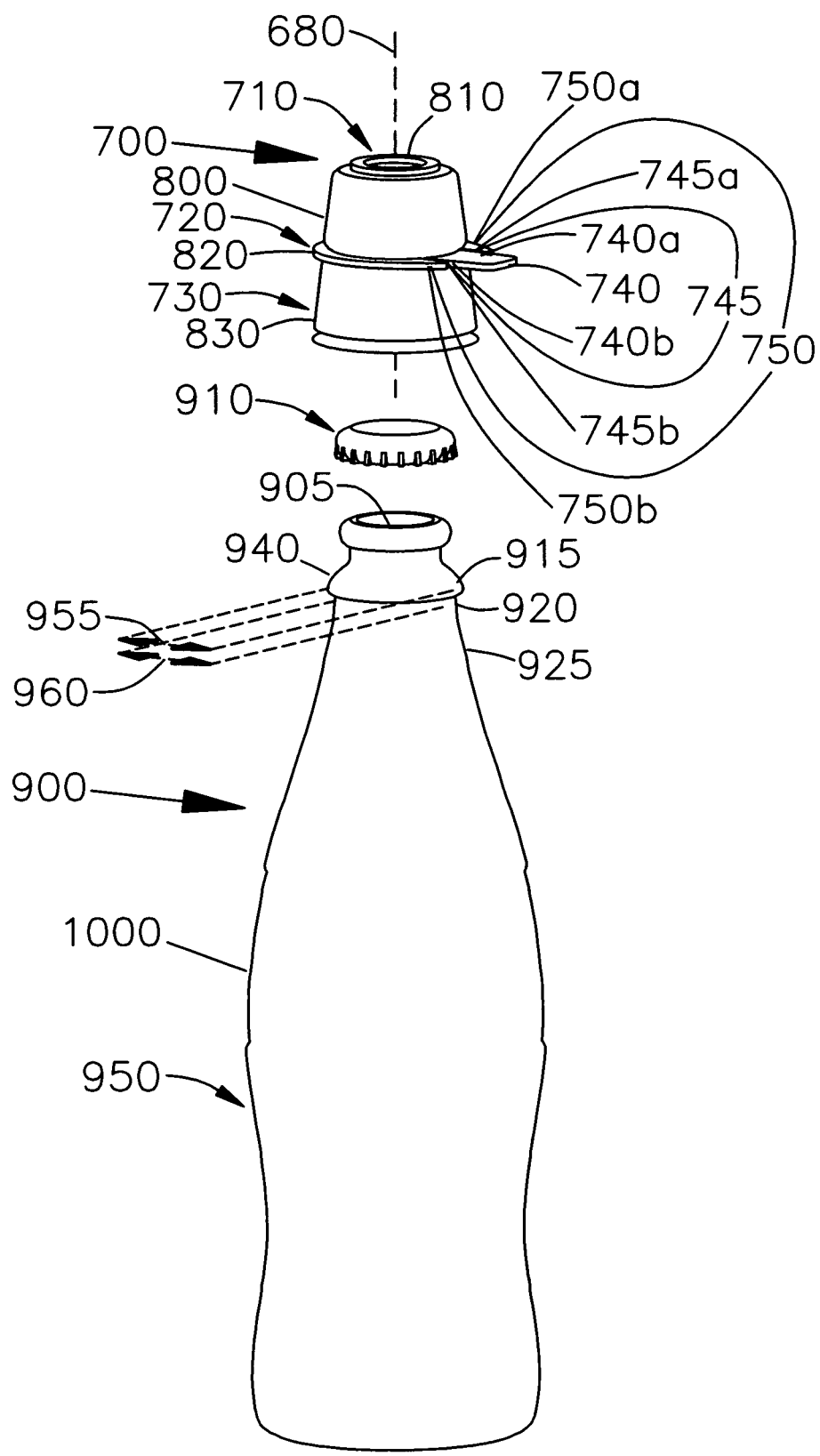
FIG. 19 is a schematic illustration of a novel reusable tamper-evident cover for a beverage bottle showing an exemplary cover and beverage bottle, constructed and operative in accordance with embodiments of the present invention.

FIG. 19 is a schematic illustration of a novel reusable tamper-evident cover for a beverage bottle showing an exemplary cover and beverage bottle, constructed and operative in accordance with embodiments of the present invention. It is understood that the embodiments described above can be adapted directly to use on beverage bottles in which in place of the circular seam for the beverage can there is a circular bulge above and in proximity to a circular indentation for the beverage bottle. A detailed description of FIG. 19 is provided below.

Reference is now made to FIG. 19. FIG. 19 illustrates a cover 700 for use with a typical beverage bottle 900. All elements and depictions of the cover 100 (and its associated elements) described above with regard to FIGS. 1-18 apply equally as well to the cover 700 (and its associated elements) in FIG. 19. It is noted that at least one tamper-evident seal may be incorporated into the cover 700.

FIG. 19 shows the cover 700 juxtaposed opposite the beverage bottle 900. The cover 700 may be formed of a single piece of semi-elastic piece of material, such as, for example, a thermoplastic. The cover 700 includes an outer cover surface 800 and an inner cover surface (not shown). The cover 700 includes a cover top 710. The cover top 710 includes an outer cover-top surface 810 and an inner cover-top surface (not shown). The cover 700 further includes a clasp ring 720. The clasp ring 720 includes an outer clasp-ring surface 820 and a circular inner clasp-ring surface (not shown). The circular inner clasp-ring surface of the clasp ring 720 includes a longitudinal center axis 680. The clasp ring 720 is positioned below the cover top 710. The circular inner clasp-ring surface of the clasp ring 720 is positioned below the inner cover-top surface of the cover top 710. The circular inner clasp-ring surface of the clasp ring 720 is contiguous with the inner cover-top surface of the cover top 710. The cover 700 further includes a skirt 730. The skirt 730 includes an outer skirt surface 830 and an inner skirt surface (not shown). The skirt 730 is positioned below the clasp ring 720. The inner skirt surface of the skirt 730 is positioned below the circular inner clasp-ring surface of the clasp ring 720. The inner skirt surface of the skirt 730 is contiguous with the circular inner clasp-ring surface of the clasp ring 720. The outer cover-top surface 810, the outer clasp-ring surface 820, and the outer skirt surface 830 are included in the outer cover surface 800. The inner cover-top surface of the cover top 710, the circular inner clasp-ring surface of the clasp ring 720, and the inner skirt surface of the skirt 730 are included in the inner cover surface of the cover 700. The clasp ring 720 includes the at least one tamper-evident seal. The at least one tamper-evident seal protrudes outwardly from a region of the outer cover-top surface 810 and a region of the outer skirt surface 830 substantially adjacent to the clasp ring 720. The at least one tamper-evident seal includes seal stubs 750 and a movable seal tab 740 and two tear lines 745. The seal stubs 750 separates from the movable seal tab 740 by the tear lines 745. It is appreciated that the at least one tamper-evident seal is incorporated into the clasp ring 720. It is also appreciated that the seal stubs 750 and the movable seal tab 740 and the tear lines 745 are incorporated into the clasp ring 720. The movable seal tab 740 includes a first side 740a and a second side 740b. The tear lines 745 include a first tear line 745a and a second tear line 745b. The seal stubs 750 include a first seal stub 750a and a second seal stub 750b. The tear lines 745 are configured to facilitate easy separation of the movable seal tab 740 from the seal stubs 750 via the application of upward pressure on the movable seal tab 740. It is appreciated that the tear lines 745 are also configured to facilitate easy separation of the movable seal tab 740 from the seal stubs 750 via the application of downward pressure on the movable seal tab 740. The movable seal tab 740 is configured such that when the movable seal tab 740 is moved to tear the two tear lines 745 the movable seal tab 740 does not separate from the cover 700. The tear lines 745 may be formed by any suitable method known in the art such as, for example, perforation and indentation. It is also appreciated that the tear lines 745 do not extend to the inner cover surface of the cover 700. Accordingly, even if the movable seal tab 740 is separated from the seal stubs 750, the inner cover surface of the cover 700 remains intact.

The beverage bottle 900 includes an outer can surface 1000 and an inner can surface (not shown). The beverage bottle 900 includes a bottle cap 910, which may be a crown bottle cap (as shown in FIG. 19). The beverage bottle 900 further includes a bottle body 950. The bottle 900 includes a drinking aperture 905. The bottle cap 910 closes the drinking aperture 905. The outer bottle surface 1000 having a circular bulge 915 with a first outer bottle diameter 955 and a circular indentation 920 with a second outer can diameter 960. The circular indentation 920 is disposed below and in proximity to the circular bulge 915. The first outer bottle diameter 955 is larger than the second outer bottle diameter 960. The circular bulge 915 protrudes outwardly immediately above the circular indentation 920. The outer bottle surface 1000 includes a drinking area 940 that is on the outer bottle surface 1000 substantially surrounding the drinking aperture 905.

As described above, the cover 700 is juxtaposed opposite the beverage bottle 900. It is appreciated that a contour of the inner cover surface (not shown) of the cover 700 is fitted substantially to an upper contour of the outer bottle surface 1000 of the beverage bottle 900. The cover top 710 is fitted over the bottle cap 910. The skirt 730 is fitted substantially to cover part of the outer bottle surface 1000 that is positioned below and in proximity the circular indentation 920, which may be a sloping surface 925 (as shown in FIG. 19). The clasp ring 720 is positioned in the circular indentation 920. It is appreciated that by positioning the clasp ring 720 in the circular indentation 920, the cover top 710 may be attached loosely to the bottle cap 910. It is also appreciated that by positioning the clasp ring 720 in the circular indentation 920, the skirt 730 may be attached loosely to part of the outer bottle surface 1000 that is positioned below and in proximity the circular indentation 920, which may be the sloping surface 925 (as shown in FIG. 19). It is also appreciated that by positioning the clasp ring 720 in the circular indentation 920, the clasp ring 720 may be snugly attached to the circular indentation 920.

The following is a description of the operation of the tamper-evident functionality of the cover 700. A user pulls the movable seal tab 740 upwards, which causes the movable seal tab 740 to break away from the seal stubs 750 along the tear lines 745. Once the movable seal tab 740 is separated from the seal stubs 750, the clasp ring 720 becomes flexible and stretchable. So much so that the clasp ring 720 no longer provides sufficient resistance to pulling the cover 700 and the circular inner clasp-ring surface of the clasp ring 720 is easily moved above the circular bulge 915, thereby enabling easy removal of the cover 700 from the beverage bottle 900. It is appreciated that the clasp ring 720 may be formed of a semi-rigid plastic that may be flexible enough to be pulled above the circular bulge 915 once the movable seal tab 740 is separated from the seal stubs 750. It is similarly appreciated, however, that the act of pulling the cover 700 off the beverage bottle 900 causes the tear lines 745 to tear if not done previously.

While certain features of the invention have been illustrated and described herein, many modifications, substitutions, changes, and equivalents will now occur to those of ordinary skill in the art. It is, therefore, to be understood that the appended claims are intended to cover all such modifications and changes, as fall within the true spirit of the invention.

What is claimed is:

1. A reusable tamper-evident cover for a beverage can, wherein the beverage can includes a drinking aperture, the beverage can further includes an inner can surface and an outer can surface, the outer can surface having a circular seam with a first outer can diameter and a circular indentation with a second outer can diameter, the circular indentation being disposed below and in proximity to the circular seam, the first outer can diameter being larger than the second outer can diameter, the outer can surface including a drinking area that is on the outer can surface substantially surrounds the drinking aperture, the cover includes an outer cover surface and an inner cover surface, the cover is removable and is configured to be disposed and redisposed on the beverage can, the cover comprising:

(a) a cover top including an inner cover-top surface and an outer cover-top surface, said inner cover-top surface adapted to be disposed only outside the outer can surface, wherein said inner cover-top surface further includes a circular internal surface, wherein said circular internal surface has an internal diameter, wherein said internal diameter is at least as large as the first outer can diameter, wherein said circular internal surface is positioned around the circular seam when the cover is disposed on the beverage can;

(b) a clasp ring disposed below said cover top, said clasp ring includes a circular inner clasp-ring surface and an outer clasp-ring surface, wherein said circular inner clasp-ring surface is positioned below said inner cover-top surface, wherein said circular inner clasp-ring surface is contiguous with said inner cover-top surface, wherein said circular inner clasp-ring surface is disposed in proximity to said circular internal surface, wherein said circular inner clasp-ring surface has an inner clasp-ring diameter, wherein said inner clasp-ring diameter has a first clasp-ring endpoint and a second clasp-ring endpoint, wherein said inner clasp-ring diameter has a center point, wherein said inner clasp-ring diameter is smaller than said internal diameter, wherein said inner clasp-ring diameter is at least as large as the second outer can diameter, wherein said inner clasp-ring diameter is smaller than the first outer can diameter, wherein said circular inner clasp-ring surface is positioned around the circular indentation when the cover is disposed on the beverage can, wherein said circular inner clasp-ring surface includes a longitudinal center axis, wherein said center axis intersects said center point, wherein said center axis is perpendicular to said inner clasp-ring diameter, said clasp ring further includes at least one tamper-evident seal, wherein said at least one tamper-evident seal is configured to be breachable, said clasp ring is further configured to prevent removal of the cover from the beverage can while said at least one tamper-evident seal is intact when the cover is disposed on the beverage can, wherein said clasp ring is further configured to enable removal of the cover from the beverage can upon at least one previously unbreached seal of said at least one tamper-evident seal being breached when the cover is disposed on the beverage can, said at least one tamper-evident seal including:

(i) a movable seal tab including a first side and a second side opposing each other;
(ii) two tear lines including a first tear line and a second tear line; and
(iii) two seal stubs including a first seal stub and a second seal stub; wherein said tab is disposed between said two seal stubs, wherein said first side is attached to said first seal stub by said first tear line, and wherein said second side is attached to said second seal stub by said second tear line, and wherein said tab is configured to be moved along said two tear lines, wherein upon moving said tab along said two tear lines causes said two tear lines to tear without separating said tab from the cover, wherein said moving results in said at least one tamper-evident seal being breached; and (c) a skirt disposed below said clasp ring, said skirt includes an inner skirt surface and an outer skirt surface, wherein said inner skirt surface is positioned below said circular inner clasp-ring surface, wherein said inner skirt surface is contiguous with said circular inner clasp-ring surface, wherein said skirt is attached with said at least one tamper-evident seal such that:

(i) a virtual, continuous, two-dimensional triangle has a first corner and a second corner, wherein said first corner and said second corner lie on said center axis, wherein said virtual, continuous, two-dimensional triangle intersects both said skirt and said tab at an intersection, wherein said intersection is continuous along an entirety of said intersection; and
(ii) said at least one tamper-evident seal is externally disposed from said outer cover-top surface and said outer skirt surface such that said tab, said two tear lines, and said two seal stubs extend:

(A) from said clasp ring outwardly away from said center axis;
(B) from a region of said outer cover-top surface and a region of said outer skirt surface substantially adjacent to said clasp ring;
(C) in parallel to a virtual, continuous, two-dimensional plane that is at least substantially perpendicular to said center axis, wherein said virtual, continuous, two-dimensional plane has an in-plane axis intersecting said center axis; and
(D) at least substantially in parallel to said in-plane axis, wherein said virtual, continuous, two-dimensional plane intersects said two tear lines, and wherein said in-plane axis is equidistant from said first tear line and from said second tear line; and
(iii) wherein said two tear lines extend partially through said at least one tamper-evident seal such that neither of said two tear lines extends to the inner cover surface, wherein at least part of said clasp ring is further externally disposed from said outer cover-top surface and said outer skirt surface, wherein said inner cover-top surface, said circular inner clasp-ring surface, and said inner skirt surface are included in the inner cover surface, and wherein said outer cover-top surface, said outer clasp-ring surface, and said outer skirt surface are included in the outer cover surface, wherein at least part of said clasp ring, excluding said tab said two tear lines and said two seal stubs, also protrudes outwardly relative to adjacent areas on said outer cover surface where said cover top and said skirt meet said clasp ring;
whereby upon moving said tab along said two tear lines causes said two tear lines to tear externally of said outer cover-top surface and said outer skirt surface without tearing the inner cover surface; and
wherein the cover is adapted to be disposed over a sealed beverage can with said tamper-evident seal intact, and wherein the cover is adapted to be redisposed over said sealed or an unsealed beverage can once said tamper-evident seal has been breached.

2. The cover of claim 1, wherein said skirt extends 360 degrees around said center axis and along said clasp ring, and wherein said inner skirt surface is contiguous, 360 degrees around said center axis, with said circular inner clasp-ring surface such that a given, virtual, continuous, two-dimensional triangle has a first given corner and a second given corner, wherein said first given corner and said second given corner lie on said center axis, wherein said given, virtual, continuous, two-dimensional triangle intersects both said skirt and said clasp ring at a resulting intersection, wherein said resulting intersection is continuous along an entirety of said resulting intersection.

3. The cover of claim 1, wherein said skirt extends 360 degrees around said center axis and along said clasp ring, and wherein said inner cover surface is continuous such that a virtual, continuous, two-dimensional rectangle has two opposing corners including a first opposing corner and a second opposing corner, wherein said first opposing corner and said second opposing corner lie on said center axis, wherein said virtual, continuous, two dimensional rectangle intersects said inner cover surface at an inner intersection, wherein said inner intersection is continuous along an entirety of said inner intersection.

4. The cover of claim 1, wherein a first distance from any first point lying on said inner cover-top surface to any second point lying on said outer cover-top surface is at least substantially equal to a second distance from any third point lying on said inner cover-top surface to any fourth point lying on said outer cover-top surface, wherein said any second point is nearest to said any first point, and wherein said any fourth point is nearest to said any third point.

5. The cover of claim 1, wherein a first distance from any first point lying on said inner skirt surface to any second point lying on said outer skirt surface is at least substantially equal to a second distance from any third point lying on said inner skirt surface to any fourth point lying on said outer skirt surface, wherein said any second point is nearest to said any first point, and wherein said any fourth point is nearest to said any third point.

6. The cover of claim 1, wherein a first distance from any first point lying on said inner cover-top surface and said inner skirt surface to any second point lying on said outer cover-top surface and said outer skirt surface is at least substantially equal to a second distance from any third point lying on said inner cover-top surface and said inner skirt surface to any fourth point lying on said outer cover-top surface and said outer skirt surface, wherein said any second point is nearest to said any first point, and wherein said any fourth point is nearest to said any third point.

7. The cover of claim 1, wherein each of said two tear lines is externally disposed from said outer cover-top surface and said outer skirt surface such that any first point lying on said circular inner clasp-ring surface, and lying on a virtual, geometric ray, wherein said virtual, geometric ray satisfies the criteria of:
(E) said virtual, geometric ray being straight one-dimensional object having one ray endpoint;
(F) said virtual, geometric ray being perpendicular to said center axis;
(G) said ray endpoint lying on said center axis; and
(H) said virtual, geometric ray intersecting one of said two tear lines, wherein a first distance from said any first point to any second point lying on said outer clasp-ring surface, and lying on said virtual, geometric ray, is greater than a second distance from any third point lying on said inner cover-top surface and said inner skirt surface to any fourth point lying on said outer cover-top surface and said outer skirt surface, and wherein said any fourth point is nearest to said any third point.

8. The cover of claim 1, wherein said clasp ring is further externally disposed, 360 degrees around said center axis, from said outer cover-top surface and said outer skirt surface such that any first point lying on said circular inner clasp-ring surface, and lying on a virtual, geometric ray, wherein said virtual, geometric ray satisfies the criteria of:
(iv) said virtual, geometric ray being a straight one-dimensional object having one ray endpoint;
(v) said virtual, geometric ray being perpendicular to said center axis;
(vi) said ray endpoint lying on said center axis; and
(vii) said virtual, geometric ray intersecting said clasp ring, wherein a first distance from said any first point to any second point lying on said outer clasp-ring surface, and lying on said virtual, geometric ray, is greater than a second distance from any third point lying on said inner cover-top surface and said inner skirt surface to any fourth point lying on said outer cover-top surface and said outer skirt surface, and wherein said any fourth point is nearest to said any third point.

9. The cover of claim 1, wherein said circular inner clasp-ring surface bulges inwardly such that any first point lying on said inner skirt surface, and on a virtual, geometric ray, wherein said virtual, geometric ray satisfies the criteria of:

(iv) said virtual, geometric ray being a straight one-dimensional object having one ray endpoint;

(v) said virtual, geometric ray being perpendicular to said center axis;

(vi) said ray endpoint lying on said center axis; and (vii) said virtual, geometric ray intersecting said inner skirt surface, wherein a first distance from said any first point to said ray endpoint, is greater than a second distance from said center point to one of said first clasp-ring endpoint and said second clasp-ring endpoint.

10. The cover of claim 1, wherein said at least one tamper-evident seal is further externally disposed from said outer cover-top surface and said outer skirt surface such that said tab, said two tear lines, and said two seal stubs extend between a first, virtual, continuous, two-dimensional plane and a second, virtual, continuous, two-dimensional plane, wherein said first, virtual, continuous, two-dimensional plane is at least substantially perpendicular to said center axis, wherein said second, virtual, continuous, two-dimensional plane is parallel to said first virtual, continuous, two-dimensional plane, and wherein said second, virtual, continuous, two-dimensional plane is positioned below and in proximity to said first, virtual, continuous, two-dimensional plane.

11. The cover of claim 1, wherein said clasp ring extends between a first, virtual, continuous, two-dimensional plane and a second, virtual, continuous, two-dimensional plane, wherein said first, virtual, continuous, two-dimensional plane is at least substantially perpendicular to said center axis, wherein said second, virtual, continuous, two-dimensional plane is parallel to said first virtual, continuous, two-dimensional plane, and wherein said second, virtual, continuous, two-dimensional plane is positioned below and in proximity to said first, virtual, continuous, two-dimensional plane.

12. The cover of claim 1, wherein said clasp ring is further externally disposed, 360 degrees around said center axis, from said outer cover-top surface and said outer skirt surface, such that said clasp ring extends between a first, virtual, continuous, two dimensional plane and a second, virtual, continuous, two-dimensional plane, wherein said first, virtual, continuous, two-dimensional plane is at least substantially perpendicular to said center axis, wherein said second, virtual, continuous, two-dimensional plane is parallel to said first virtual, continuous, two-dimensional plane, and wherein said second, virtual, continuous, two dimensional plane is positioned below and in proximity to said first, virtual, continuous, two-dimensional plane.

13. The cover of claim 1, wherein said cover top, said clasp ring, said at least one tamper-evident seal, and said skirt are initially configured as a single unitary structure.

* * * * *